United States Patent [19]

Ikenoue et al.

[11] Patent Number: 4,975,858
[45] Date of Patent: Dec. 4, 1990

[54] CONTROLLER FOR A PRINTER FOR PRINTING DATA RECEIVED FROM AN EXTERNAL DATA PROCESSOR

[75] Inventors: Yoshikazu Ikenoue; Ikunori Yamaguchi, both of Osaka, Japan

[73] Assignee: Minolta Camera Kabushiki Kaisha, Osaka, Japan

[21] Appl. No.: 291,272

[22] Filed: Dec. 28, 1988

[30] Foreign Application Priority Data

Dec. 28, 1987 [JP] Japan .................................. 62-333761
Dec. 28, 1987 [JP] Japan .................................. 62-333762

[51] Int. Cl.⁵ .............................................. G06F 3/09
[52] U.S. Cl. .................................. 364/519; 346/33 R; 346/160; 364/518
[58] Field of Search ............... 364/518, 519, 521, 523; 340/750, 798, 799, 800; 346/33 R, 154, 160

[56] References Cited

U.S. PATENT DOCUMENTS

| 4,648,047 | 3/1987 | Berkland et al. | 364/519 |
| 4,675,833 | 6/1987 | Cheek et al. | 364/523 |
| 4,694,405 | 9/1987 | Bradbury et al. | 364/518 |
| 4,698,755 | 10/1987 | Okazaki et al. | 364/519 |
| 4,737,923 | 4/1988 | Matsuzaki et al. | 364/519 |
| 4,769,648 | 9/1988 | Kishino et al. | 364/519 X |

OTHER PUBLICATIONS

U.S. patent appln. Ser. No. 72,722 pending before Examiner Herndon in Group Art Unit 231.
U.S. patent appln. Ser. No. 290,867 believed to be pending before Examiner Shaw in Group Art Unit 216.

Primary Examiner—Dale M. Shaw
Assistant Examiner—H. R. Herndon
Attorney, Agent, or Firm—Price, Gess & Ubell

[57] ABSTRACT

A controller for a printer for printing data received from an external data processor. The controller comprises a first memory for storing the received data, an analyzer for analyzing the data stored in the first memory, and a second memory for storing the data analyzed by the analyzer. In the controller, the data stored in the first memory corresponding to the data stored in the second memory is reanalyzed by the analyzer in accordance with alteration of a format data.

9 Claims, 26 Drawing Sheets

CONTROLLER FOR A PRINTER FOR PRINTING DATA RECEIVED FROM AN EXTERNAL DATA PROCESSOR

BACKGROUND OF THE INVENTION

1. FIELD OF THE INVENTION

The present invention relates to a controller for a printer for printing bit images according to data input from an external data processor such as a host computer.

2. DESCRIPTION OF PRIOR ART

Generally, data fed from an external data processor such as a host computer etc. include printing data representing an actual printing pattern and control data for controlling a printing method and a mode of a print engine of the printer. A controller for the printer processes the data by transforming them into dot images or bit map images to be actually printed out and sends them to the print engine.

Recently, with increasingly high performance of printers, the technical specification of the control data has been extremely complicated. Therefore, a relatively long time is needed for processing the print data by the controller. No great improvement in the processing speed of a CPU for controlling the controller can be expected because of the limitation of the performance of the hard-ware thereof, resulting in that it is difficult to provide a printer which is able to process the print data at a higher speed. Therefore, even though a print engine having a higher printing speed is used, the efficiency of the data processing can not be improved.

In order to improve the through-put of the printer system, there is provided a method for transforming data of pages subsequent to the page in printing into intermediate codes, by calculating print addresses and analyzing protocols such as a font selection and the like beforehand. However, it is impossible to alter a size or a direction of a copy paper with respect to data having been already transformed into intermediate codes even if they are not printed yet.

The present invention is intended to overcome the aforementioned disadvantages by interrupting the processing for printing and reanalyzing the data when the command for altering the paper size or the printing direction, is entered from the printer.

In the case of the aforementioned reanalysis of the data, if a protocol for outputting a response data to the external data processor is included in the data to be reanalyzed, the response data is outputted to the external data processor during reanalyzing of the data, resulting in a trouble caused in the external data processor.

SUMMARY OF THE INVENTION

An essential object of the present invention is to provide a controller for a printer which is able to alter a format, such as the paper size or the printing direction during printing of the data.

Another object of the present invention is to provide a controller for a printer which is capable of reanalyzing the data from the external data processor in accordance with a command for altering the format during printing of the data.

A further object of the present invention is to provide a controller for a printer which is capable of inhibiting the output of the data to the external data processor during the aforementioned reanalysis.

According to one aspect of the present invention, there is provided a controller for a printer for printing data received from an external data processor, comprising: a communication means for receiving the data from said external data processor; a first memory means for storing the data received by said communication means; a conversation means for converting the data stored in said first memory means; a second memory means for storing the formulated data converted by said conversion means; an output means for outputting the formulated data stored in said second memory means to said printer; an input means for inputting alteration of format data; and a control means for making said conversion means convert again the data stored in said first memory means corresponding to the formulated data stored in said second memory means in accordance with the alteration of the format data input by said input means.

According to another aspect of the present invention, there is provided a controller for a printer for printing data received from an external data processor, comprising: a communication means for receiving the data from said external data processor; a first memory means for storing the data received by said communication means; a first converting means for converting the data stored in said first memory means to intermediate codes; a second memory means for storing the intermediate codes converted by said converting means; a second converting means for converting the intermediate codes stored in said second memory means so as to convert the intermediate codes for image to bit images; a third memory means for storing the bit images converted by said second converting means; an output means for outputting the bit images stored in said third memory means to said printer; an input means for inputting alteration of format data; and a control means for invalidating the intermediate codes stored in said second memory means and making said first converting means convert the stored data in said first memory means again to the intermediate codes based on the altered format data so as to perform the reprocessing in accordance with the alteration of the format data input by said input means.

Accordingly, even though the received data is being printed, the format data such as the paper size or the printing direction can be altered, resulting in that it is not necessary to reset the printer.

According to a further aspect of the present invention, there is provided a controller for a printer for printing data received from an external data processor, comprising: a communication means for receiving the data from said external data processor; a first memory means for storing the data received by said communication means; a conversion means for converting the data stored in said first memory means into formulated data based on format data; a second memory means for storing the formulated data converted by said conversion means; an output means for outputting the data stored in said second memory means to said printer; and a control means for making said conversion means convert again the data stored in said first memory means corresponding to the formulated data which is first converted by said conversion means and inhibiting the output of a response data obtained during second conversion of the data to said external data processor.

Accordingly, even though a protocol for outputting the response data to the external data processor is included in the data to be converted again, the output of the response data can be inhibited, resulting in that a trouble can be avoided and it is not necessary to reset the printer.

BRIEF DESCRIPTION OF THE DRAWINGS

The present invention may be better understood and its numerous objects and advantages will become apparent to those skilled in the art by reference to the accompanying drawings as follows.

DETAILED DESCRIPTION OF THE PREFERRED EMBODIMENT

The preferred embodiment according to the present invention will be described below, referring to the attached drawings.

(a) Composition of Electro-photographic Printer

Figure 1:
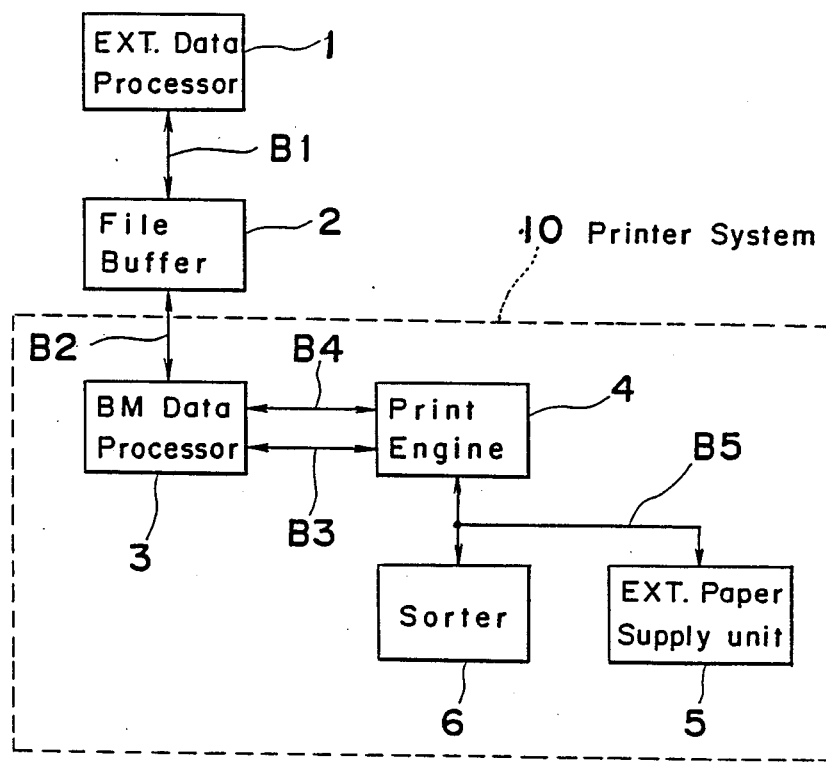
FIG. 1 is a block diagram showing a printer system according to the preferred embodiment of the present invention.

FIG. 1 shows an image forming system including a printer system 10 according to the preferred embodiment of the present invention.

Data from an external data processor 1 such as a host computer are once stored into an external file buffer 2 in order to improve through-put of the external data processor 1, and thereafter, the stored data are outputted from the file buffer 2 to the printer system 10.

The printer system 10 includes a bit map type data processor 3, a print engine 4 including a laser and an electro-photographic printer, and accessary apparatus such as an external paper supply unit 5, a sorter 6 and the like.

Figure 2:
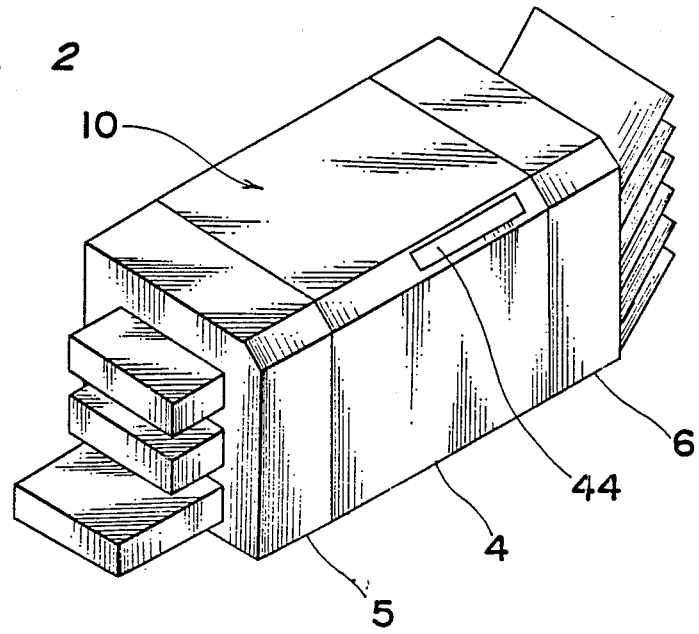
FIG. 2 is a perspective view showing the printer system shown in FIG. 1.

FIG. 2 is a perspective view showing the printer system 10.

The print engine 4 installs the bit map type data processor 3 therein, and the external paper supply unit 5 and the sorter 6 are assembled to the print engine 4. On a front edge portion of the upper surface of the body of the print engine 4, there is provided an operation panel 44 having a display for displaying various indications regarding the printer system and keys for inputting data and commands.

Figure 3:
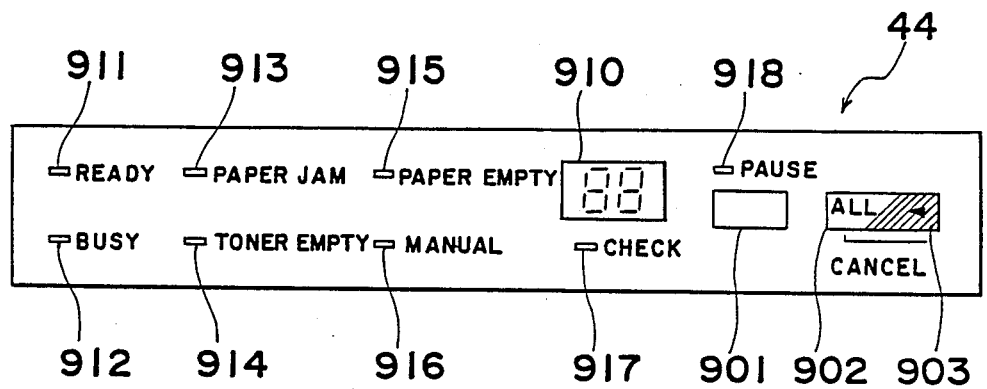
FIG. 3 is a top plan view showing an operation panel of the printer system shown in FIG. 2.

FIG. 3 is a top plan view showing the operation panel 44. On the operation panel 44, entry keys 901 to 903 and indicators 910 to 918 are arranged. The key 901 is a PAUSE key for stopping a printing operation temporarily. The key 902 is a TEST key for performing a test printing operation. The key 903 is a SHIFT key, and the SHIFT key 903 becomes a CANCEL key for stopping a printing operation when it is pushed down together with the TEST key 902. The reason why the CANCEL function becomes effective only when both of the keys 902 and 903 are pushed down at the same time is to avoid an undesirable cancel function by a careless operation.

Figure 4:
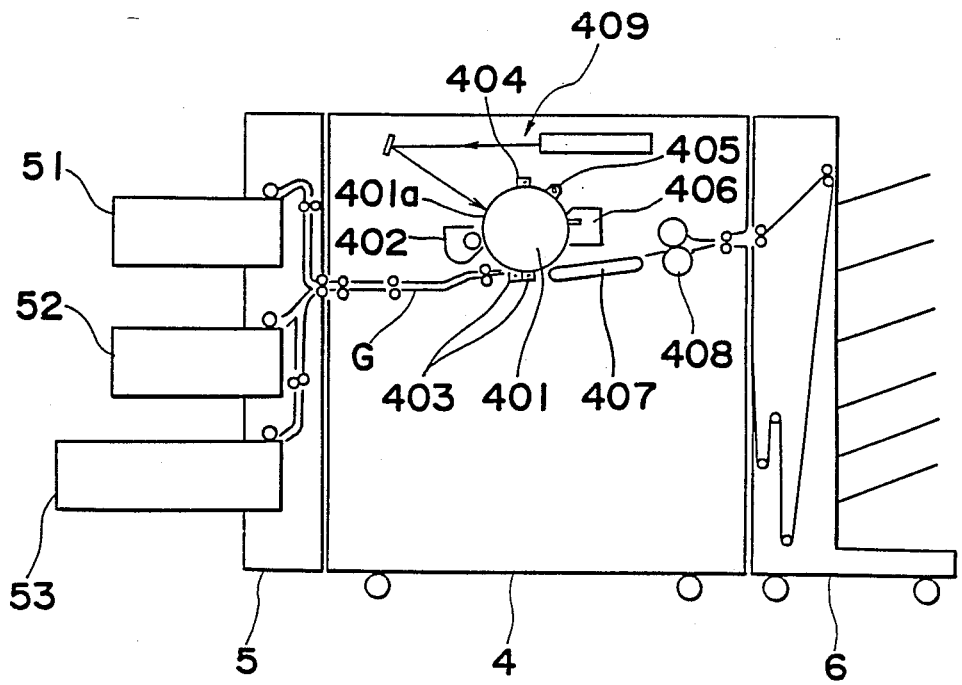
FIG. 4 is a schematic side sectional view showing the printer system shown in FIG. 2.

FIG. 4 is a schematic side sectional view of the printer system 10 showing a paper feeding passage G formed therein. Paper sheets are arranged to be selectively fed into the passage G from three paper feeding cassettes 51, 52 and 53 detachably mounted on the paper supply unit 5. Within the print engine 4, generally at its central upper portion, there is rotatably provided a photoreceptor drum 401 having a photoconductive layer 401a formed on its peripheral surface, around which there are sequentially disposed various processing stations such as a corona charger 404, a developing device 402, a transfer charger 403, a cleaner 406 and an eraser lamp 405 etc..

After removal of the residual toner by the cleaner 406, the photoconductive layer 401a of the photoreceptor drum 401 is uniformly charged by the corona charger 404 and eraser lamp 405. The photoconductive layer 401a is exposed to an image from light transmitted through an optical system 409 so as to form an electrostatic latent image thereon. The latent image thus formed is then developed into a visible toner image by the developing device 402. The toner image is subsequently transferred onto a copy paper sheet fed through the paper feeding passage G by the transfer charger 403, and the copy paper sheet having the transferred image is transported to a fixing device 408 via a transport belt 407, and after fixing of the image thereonto by the fixing device 408, the copy paper sheet is accommodated into the sorter 6.

Figure 5:
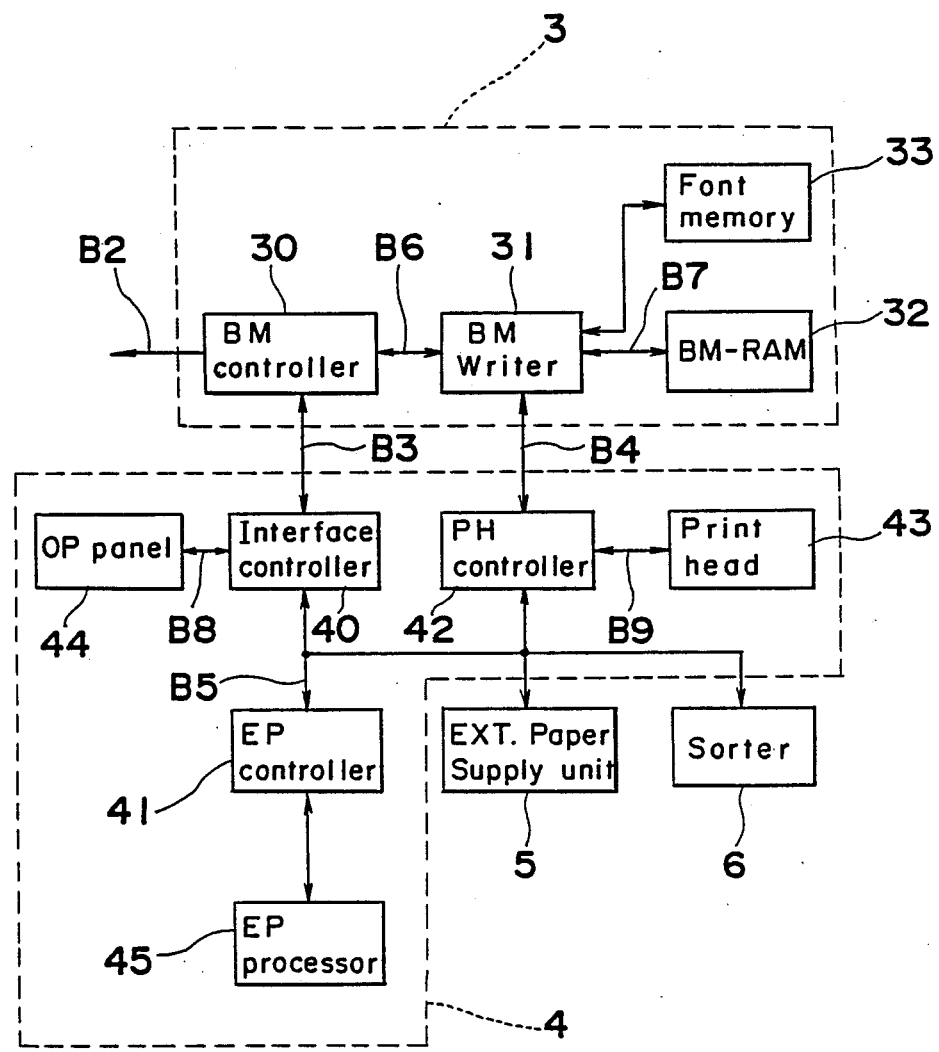
FIG. 5 is a block diagram showing a bit map type data processor and a print engine shown in FIG. 1.

FIG. 5 is a block diagram of the printer system 10.

The bit map type data processor 3 includes a bit map controller (BMC) 30, a bit map random access memory (BM-RAM) 32, a bit map writer (BMW) 31 for imaging bit images on the BM-RAM 32 and a font memory 33 connected to each other as shown in FIG. 5. The communication between the bit map type data processor 3 and the print engine 4 is performed through a bus B3 for control data such as a number of prints, an accessory control signal and the like, and a bus B4 for image data.

The print engine 4 further includes an interface controller 40, an electro-photographic process controller 41 and a print head controller (PHC) 42. The interface controller (IFC) 40 performs the processing of control data from the bit map controller 30, the control of the operation panel 44 and the timing control of the print engine 4 through an internal bus B5. The electro-photographic process controller 41 controls an electro-photographic processor 45 according to data sent from the interface controller 40 through the internal bus B5.

The PHC 42 controls the emitting of a semiconductor laser (not shown) and the rotation of a polygon mirror (not shown), both of which are provided in a print head 43. The PHC 42 controls the laser and polygon mirror using information sent from the IFC 40 through the internal bus B5 in order to write image data sent from the BMW 31 through the internal bus B4 on the photoconductive layer 401a of the photoreceptor drum 401. Also, the external paper supply unit 5 and the sorter 6 are controlled through the internal bus B5 by the IFC 40.

As is apparent from the above description, the printer system 10 is a kind of laser printer of bit map type. Print data (being usually represented by codes) sent from the external data processor 1 are converted to dot image on the BM-RAM 32 of the bit map type data processor 3, and then, the converted dot image is outputted to the print engine 4. The print engine 4 writes the dot image on the photoconductive layer 401a of the drum 401 by controlling the laser according to data sent from the bit map type data processor 3, and the print engine 4 transfers the written dot image on a sheet of blank paper according to the electro-photographic process as is well known to those skilled in the art.

Data sent from the external data processor 1 includes codes for control of print format and codes for setting respective modes of the print engine 4 other than character data or image data. The bit map type data processor 3 analyzes protocols of these codes other than character data and outputs commands for the print format control, for supplying blank paper to the print engine 4, for alteration of the mode of the accessory and the like according to the result of the protocol analysis. The print engine 4 performs various controls such as control of the electro-photographic system, timing control of recording paper, control in synchronous with paper feeding toward the sorter 6, besides the recording control referred to above. These controls are similar to those of an electro-photographic copy machine except control of scanning system needed for the latter.

(b) Bit Map Controller

Figure 6:
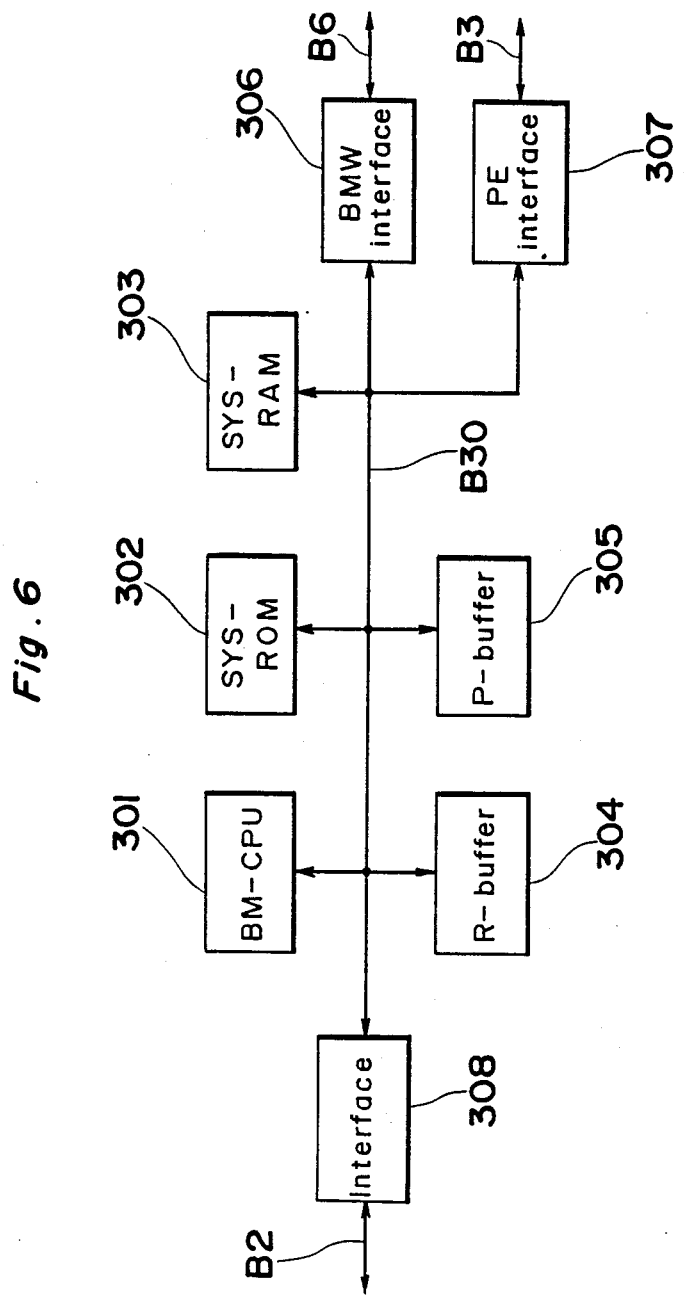
FIG. 6 is a block diagram showing a bit map controller shown in FIG. 5.

FIG. 6 is a block diagram of the bit map controller 30.

The bit map controller 30 is comprised of several units connected to each other through the internal bus B30. A bit map central processing unit (BM-CPU) 301 is a central controller for the bit map type data processor 3. The BM-CPU 301 communicates with the external data processor 1 and the external file buffer 2 through a data processor interface 308, and BM-CPU 301 converts the input print data to codes. The BM-CPU 301 also controls the bit map writer 31 through a bit map writer interface 306 and controls the print engine 4 though a print engine interface 307. A system read only memory (SYS-ROM) 302 stores programs for the BM-CPU 301. A system random access memory (SYS-RAM) 303 is provided as a working memory area for the BM-CPU 301 including a MCB buffer area described below in detail, and the SYS-RAM 303 is used for storing stacks and fundamental flags.

A reception buffer (R-buffer) 304 is provided as a buffer for communicating with the external data processor 1 and the external file buffer 2, and is provided for the communication between the BM-CPU 301 and the data processor 1 in asynchronous state.

A packet buffer (P-buffer) 305 stores data from the data processor 1 in the form of an intermediate code (referred to hereinafter as the packet) which is converted according to the font attribute, wherein the bit images are written easily in the BM-RAM 32 by using the packet.

The bit images are written with use of the font by the bit map writer 31. It is necessary to calculate parameters to be outputted to the bit map writer 31, such as an address in which a font pattern is stored, an address of the BM-RAM 32 in which bit images are written etc., and it takes a predetermined time to calculate the above parameters. Therefore, in order to process the print data at high speed, the data of the next page is previously processed while the data of a page stored in the BM-RAM 32 is printed. In order to perform the above processing, the P-buffer 305 functions as a first in first out (FIFO) memory.

A print engine interface 307 is an interface for communicating with the print engine 4, and the print engine interface 307 exchanges JOB CONTROL commands such as PRINT command etc., with an interface in the print engine 4 through the bus B3.

Figure 7:
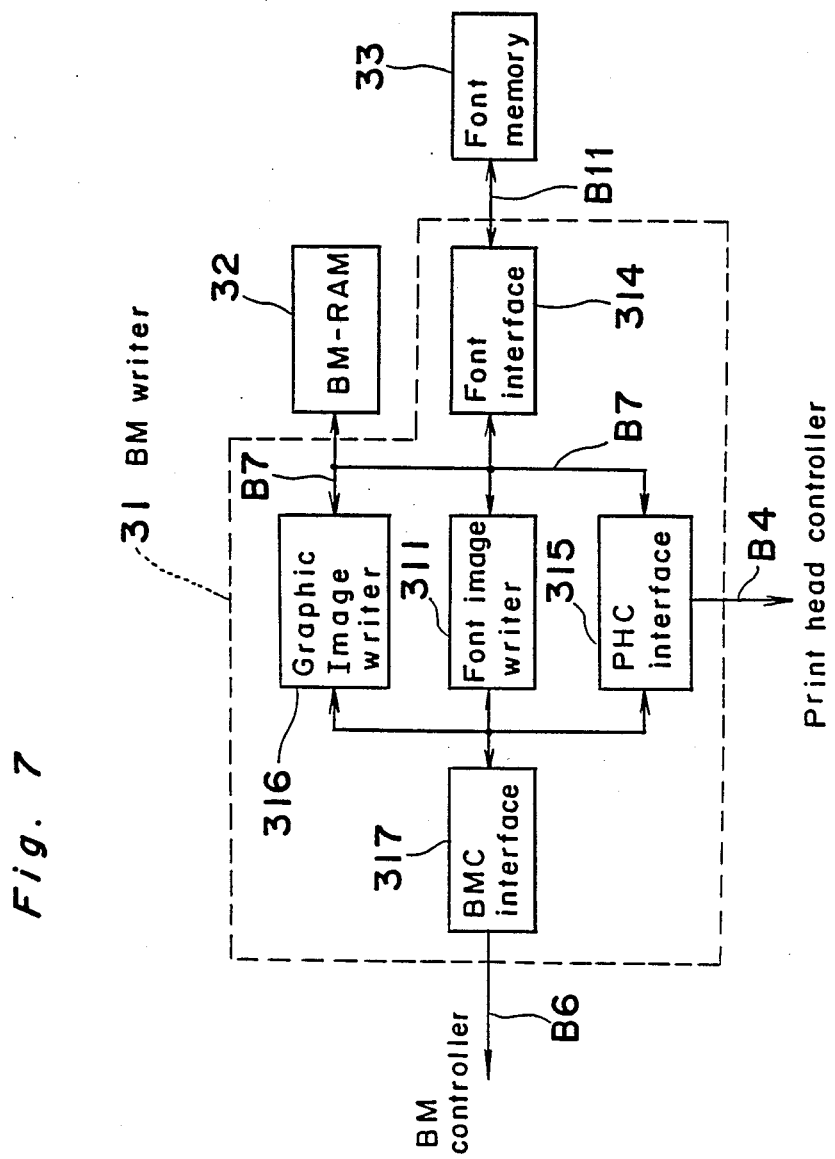
FIG. 7 is a schematic diagram showing a bit map writer shown in FIG. 5.

FIG. 7 shows a construction of the bit map writer 31 shown in FIG. 5.

Functions of the bit map writer 31 are generally classified into an imaging function onto the BM-RAM 32 and an outputting function for outputting the data in the BM-RAM 32 to the print engine 4 upon printing.

The imaging function is further divided into an imaging function for imaging lines and/or circles which is executed by a graphic image writer (GIW) 316 and an imaging function for imaging characters which is executed by a font image writer (FIW) 311. Both of graphic and font image writers 316 and 311 are operated according to packets sent from the bit map controller 30 through a bit map controller (BMC) interface 317. The graphic image writer 316 usually writes bit images in the BM-RAM 32 according to the results obtained by analyzing parameters included in a packet, while the font image writer 311 usually writes font image in the BM-RAM 32 which is read from the font memory 33 through a font memory interface 314 according to the data in the packet.

On the contrary, the output function for outputting data upon printing is executed by a print head controller interface 315. That is, when the print head controller interface 315 receives a PRINT START code sent from the bit map controller 30 through the bit map controller interface 317, it outputs the data in the BM-RAM 32 to the print head controller 42 in accordance with a synchronizing signal sent from the print head controller 42 through the bus B4.

(c) Bit Map Control

The operation of the printer system 10 will be described below, referring to the attached flow charts.

FIGS. 10 to 24 are flow charts showing processings of the bit map controller 30.

Figure 10:
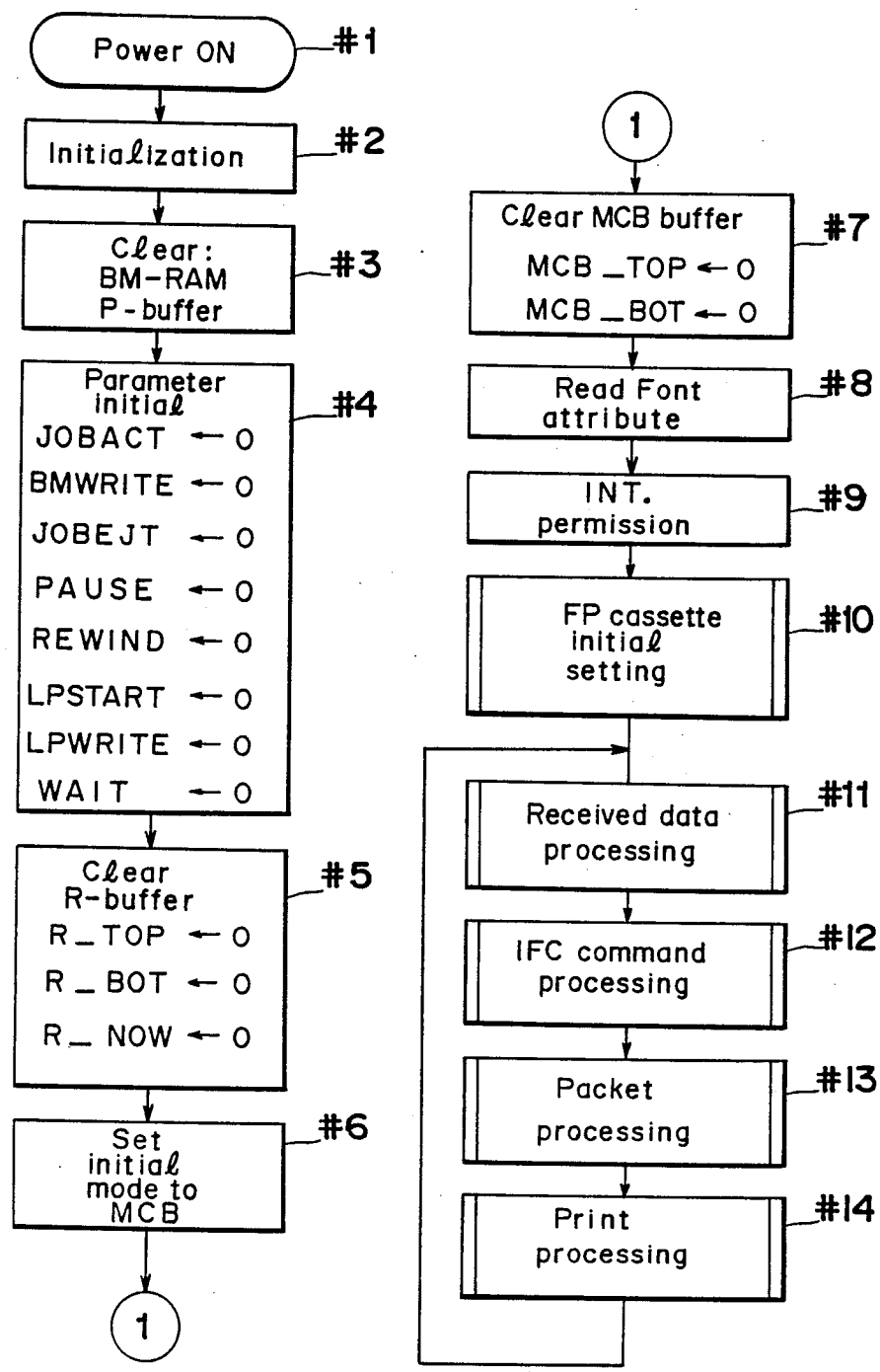
FIGS. 10 to 24 are flow charts showing processings of the bit map controller shown in FIG. 5.

In FIG. 10, after the power is supplied at step #1, the bit map controller 30 is initialized internally at step #2, and then, the data stored in the BM-RAM 32 and the P-buffer 305 are cleared at step #3 and flags are initialized at step #4. Functions of the flags are as follows:

JOBACT : representing a printing state of image data of a page (when a print for a set number of prints is not completed).

BMWRITE representing that data is stored in the BM-RAM 32.

JOBEJT : representing a print start request.

PAUSE : representing a pause state (when a print is stopped temporarily).

REWIND : representing a reanalysis of the received data.

LPSTART : representing that an analysis of page data is started.

LPWRITE : representing that a temporary editing of page data (image data) is started.

WAIT : representing that a packet processing is stopped temporarily.

Thereafter, the R-buffer 304 is cleared at step #5, wherein pointers in the R-buffer 304 are initialized. The R-buffer 304 is managed with use of the following three pointers shown in FIG. 9b. Functions of the pointers in the R-buffer 304 are as follows:

R.TOP : representing an address in which the data received next time is stored.

R.NOW : representing an address in which the data analyzed next time is stored.

R.BOT : representing an area of the data to be stored in the R-buffer 304

The initial values of the respective pointers are 0.

Figure 9A:
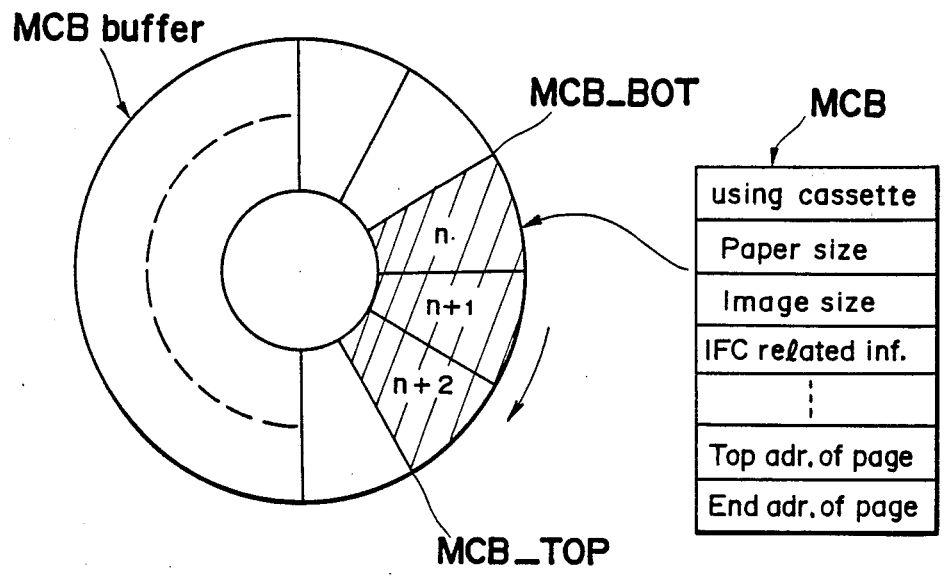
FIG. 9a is a diagram showing a memory control block (MCB) buffer and memory control block (MCB) information.
Figure 9B:
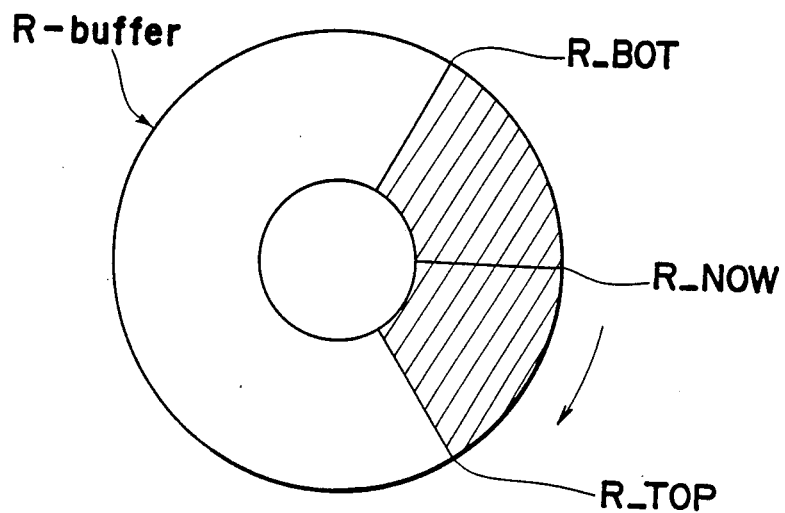
FIG. 9b is a diagram showing a reception buffer shown in FIG. 6.

Thereafter, a memory control block (MCB) for storing mode information used for analyzing the received data is initialized at step #6. As shown in FIG. 9a, the MCB is one group of data such as a using cassette, a paper size, an image size, IFC related information, a top address of page, an end address of page etc.. A MCB buffer (shown in FIG. 9a) for storing data of the MCB is initialized at step #7. The MCB buffer is used for storing the analysis condition of respective pages when the received data is reanalyzed, and the MCB buffer is managed with use of the following two pointers:

MCB.TOP : representing an address in which the MCB of the next page is stored.

MCB.BOT : representing an area of data to be stored in the MCB buffer.

The initial values of respective above pointers are 0 and the values of the pointers are renewed every size of the MCB.

Thereafter, the font attribute used for editing the print data is read out at step #8, and the interruptions are allowed at step #9. Then, the initial setting of the paper feeding cassette is performed at step #10, and the program flow goes to an actual processing loop (steps #11 to #14).

The actual processing is comprised of the following four processings:

Received data processing (step #11) : receiving the data from the data processor 1 and converting the received data into the packet.

IFC command processing (step #12) : processing data from the print engine 4.

Packet processing (step #13) : Writing dot image in the BM-RAM 32 according to the packet.

Print processing (step #14) : processing a print sequence with the IFC 40.

In order to increase the efficiency of the communication, the data sent from the data processor 1 is stored temporarily in the R-buffer 307 according to a reception interruption processing as described below in detail.

In the received data processing (step #11), the received character data is read out from the R-buffer 304 and is converted into the packet, and then the packet is stored temporarily in the P-buffer 305. Thereafter, in the packet processing (step #13), the packet stored in the P-buffer 305 is read out and the font corresponding to the read packet is written in the BM-RAM 32 by the bit map writer 31. When a print request code (PAGE.EJECT) is detected from the received data, the actual print is started in the print processing (step #14).

The other processings such as temporary stop of printing, interruption of processing etc. are performed.

<Received Data Processing>

Figure 11A:
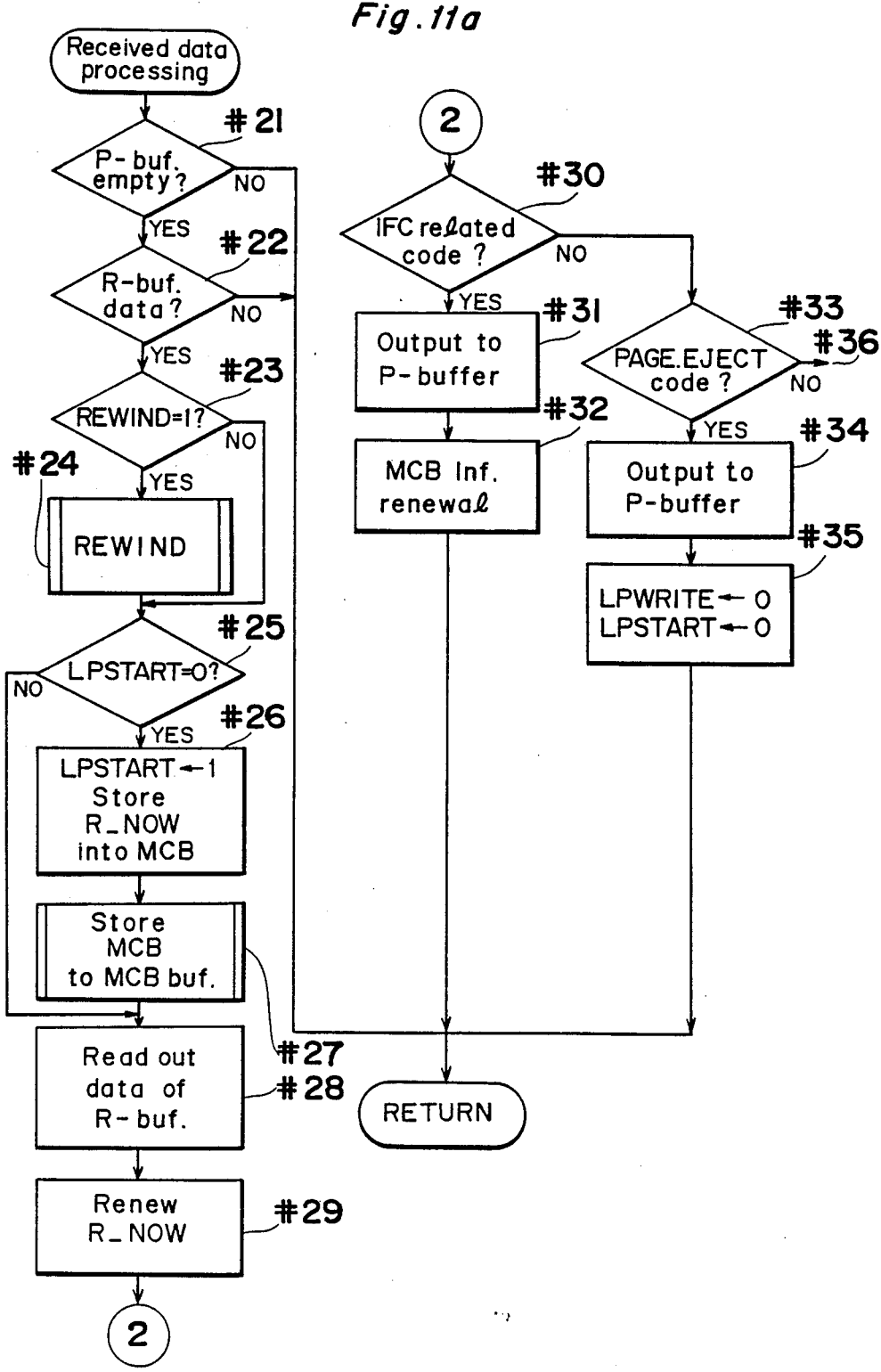
Figure 11B:
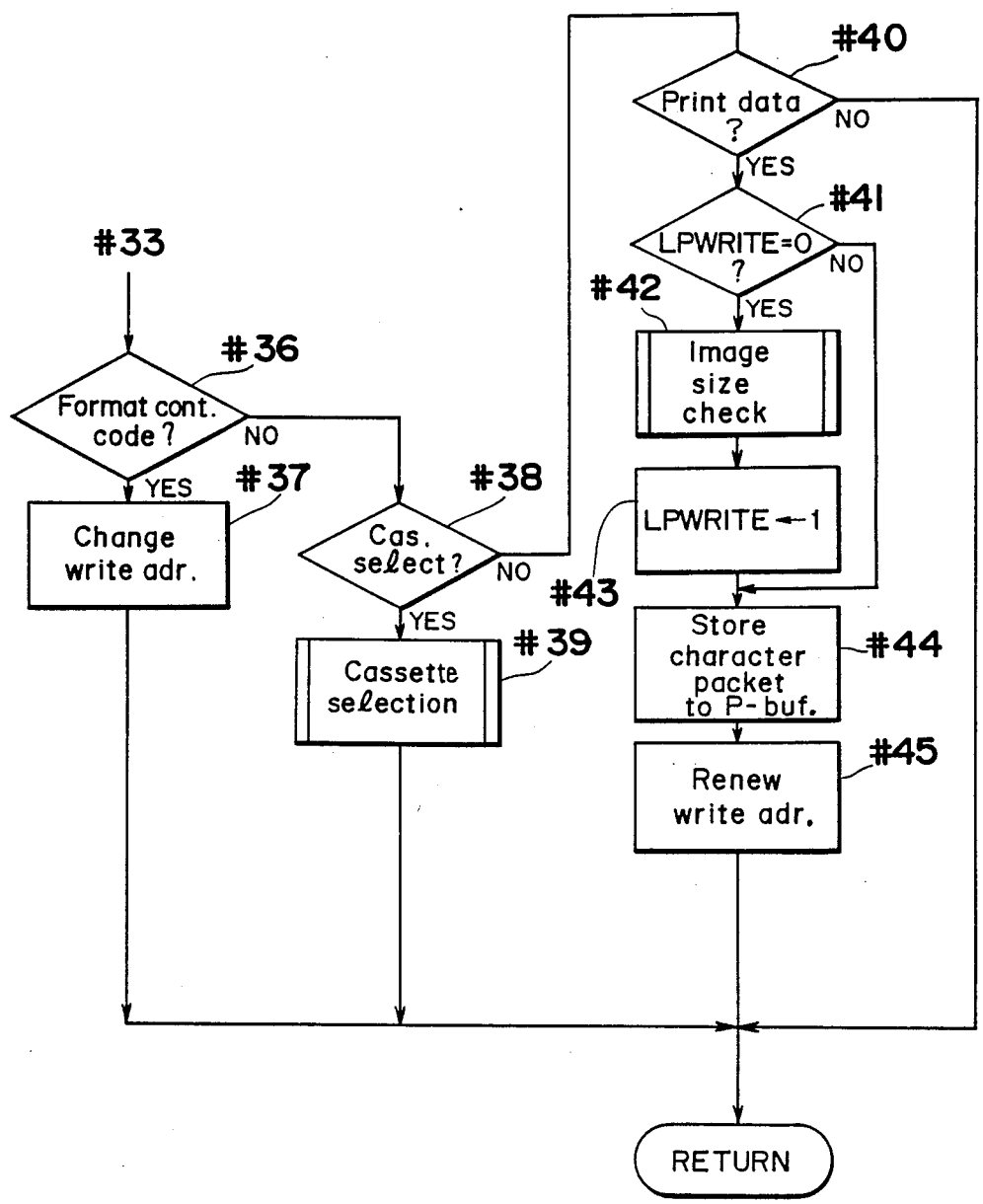

FIGS. 11a and 11b are flow charts showing the received data processing (step #11).

In FIG. 11a, the received data is previously converted into the packet which is outputted to the bit map writer 31, and the packet is stored in the P-buffer 305. These processings are executed in order to improve the through-put by converting the received data in the BM-RAM 32 during printing.

First of all, it is judged whether or not there is an empty area in the P-buffer 305 at step #21, and it is judged whether or not data has been received in the R-buffer 304 at step #22. If there is not an empty area in the P-buffer 305 at step #21 or data has not been received in the R-buffer 304 at step #22, the program flow returns. On the other hand, there is an empty area in the P-buffer 305 at step #21 and data has been received in the R-buffer 304 at step #22, the program flow goes to step #23.

Figure 17:
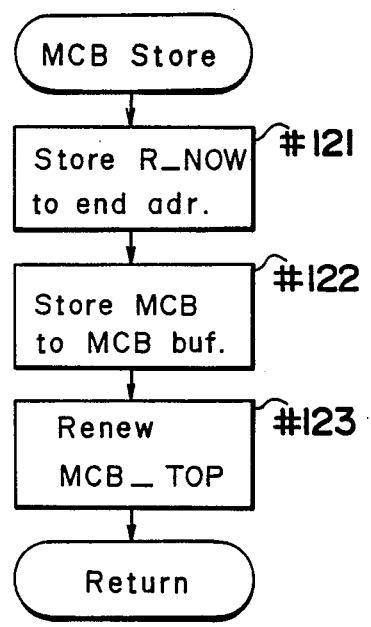

At step #23, it is judged whether or not it is necessary to perform the reanalysis processing of the received data (REWIND=1). If the REWIND flag is 1, the reanalysis processing of the received data is performed at step #24, and then, the program flow goes to step #25. On the other hand, if the REWIND flag is not 1, the program flow goes to step #25 without the reanalysis processing of the received data. At step #25, it is judged whether or not the analysis of the top data of page is performed (LPSTART= 0). If the LPSTART flag is 0, "1" is set to the LPSTART flag and the address R.NOW is stored in the MCB for the reanalysis at step #26, and the MCB is stored temporarily in the MCB buffer at step #27 as shown in FIG. 17, and then, the program flow goes to step #28. Therefore, when the reanalysis is performed, the top address of page can be read out from the MCB buffer. If the LPSTART flag is not 0 at step #25, the program flow goes to step #28. Thereafter, the data is read out from the address R.NOW of the R-buffer 304 at step #28, and then, the address R.NOW is renewed at step #29.

Thereafter, it is judged whether or not the received data is an interface controller related code (referred to hereinafter as the IFC related code) at step #30. If the received data is the IFC related code, the IFC related code is converted into the packet in the different form from the character in order to synchronize with a processing in the packet processing of the character, and the packet is outputted to the P-buffer 305 at step #31. Thereafter, the MCB information is renewed at step #32, and the program flow returns. On the other hand, if the received data is not the IFC related data at step #30, it is judged whether or not the received data is the PAGE.EJECT code at step #33.

If the received data is the PAGE.EJECT code at step #33, the print operation is started in the packet processing since the PAGE.EJECT code represents the end of the data of one page, and the print operation is started when the former character is written in the BM-RAM 32. Thereafter, the PAGE.EJECT code is outputted to the P-buffer 305 at step #34 in order to synchronize with the processings of the former and subsequent characters. Then, the LPWRITE flag and the LPSTART flag are reset for preparation for the temporary editing of the next page at step #35, and the program flow returns.

If the received data is not the PAGE.EJECT code at step #33, it is judged whether or not the received data is a FORMAT CONTROL code at step #36. If the received data is the FORMAT CONTROL code, the write address into the BM-RAM 32 is altered correspondingly to the respective codes at step #37, and then, the program flow returns.

Figure 21:
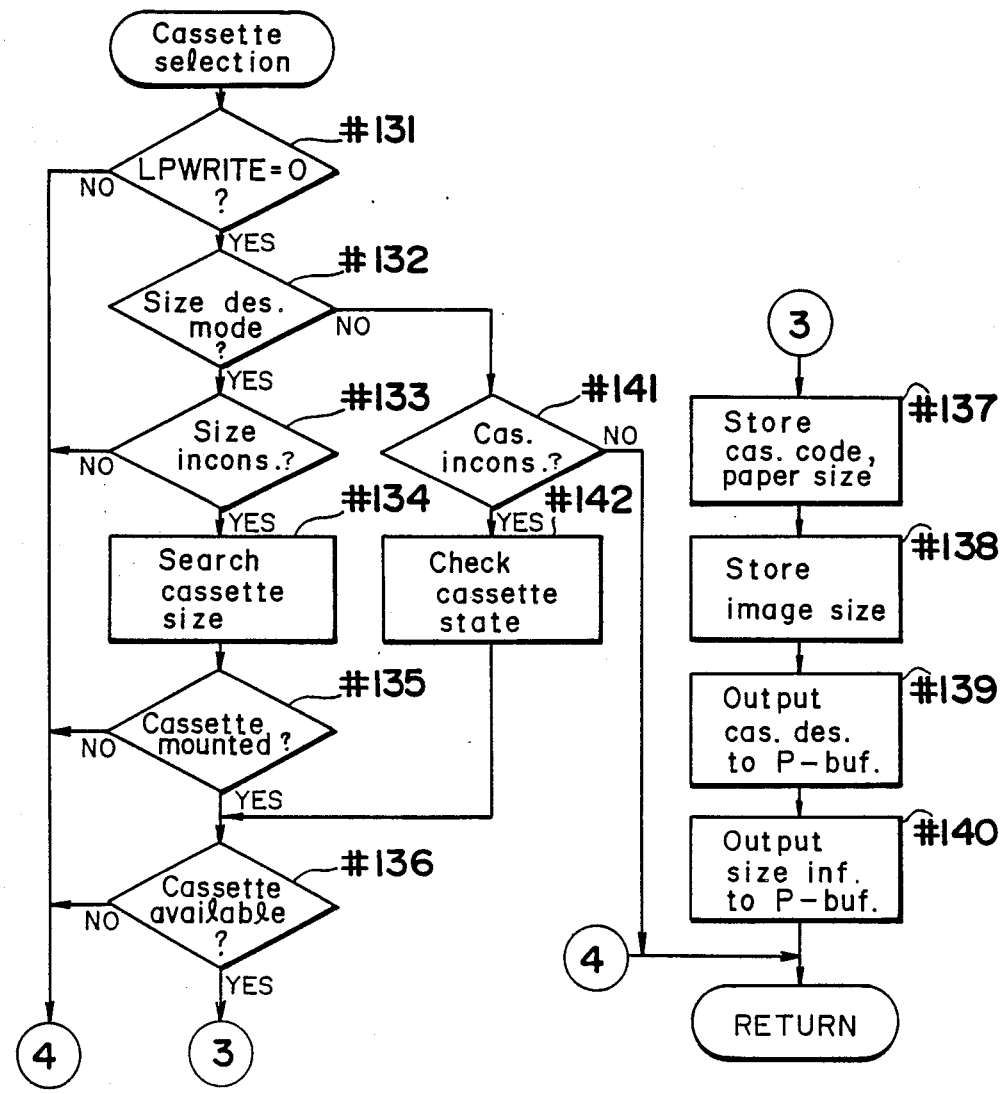

If the received data is not the FORMAT CONTROL code at step #36, it is judged whether or not the received data is a CASSETTE SELECTION code at step #38. If the received data is the CASSETTE SELECTION code, a cassette is selected according to the designated mode at step #39 as shown in FIG. 21, and then, the program flow returns.

Figure 20:
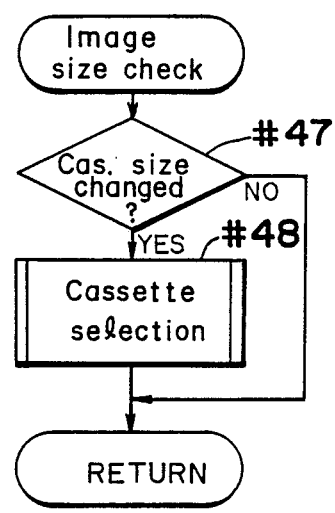

If the received data is not the CASSETTE SELECTION code at step #38, it is judged whether or not the received data is the print data at step #40. If the received data is the print data, it is judged whether or not the temporary editing of the page data is not started (LPWRITE=0) at step #41. If the temporary editing of the page data is not started, the image size is checked at step #42 as shown in FIG. 20, "1" is set to the LPWRITE flag at step #43 in order to indicate that the temporary editing of the page data has been started, and then, the program flow goes to step #44. On the other hand, if the LPWRITE flag is not 0 at step #41, the program flow goes to step #44. If the received data is not the print data at step #40, the program flow returns.

At step #44, the received character data is converted into the packet according to the font attribute read when the power is supplied. Concretely, first of all, the font address of the pattern corresponding to the received character code is outputted to the P-buffer 305, the write address into the BM-RAM 32 is outputted sequentially to the P-buffer 305, and the write mode into the bit map writer 31 is outputted. Thereafter, the write address into the BM-RAM 32 for the next font is renewed according to the size etc. of the font at step #45 and the program flow returns.

Figure 8:
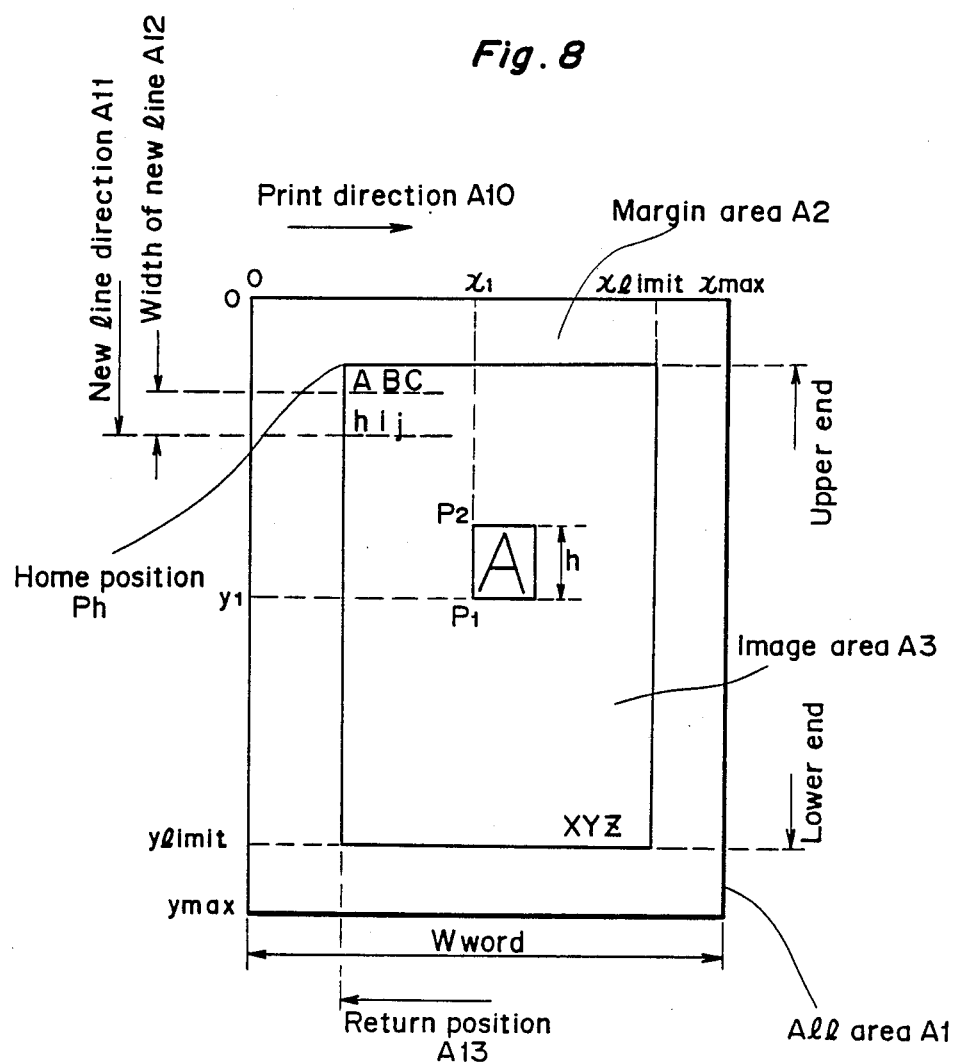
FIG. 8 is a diagram for explaining an image area and a write address.

FIG. 8 shows an example of an image area.

Whole area A1 corresponding to a paper size is an area provided in the BM-RAM 32. A margin area A2 is an area to be left blank upon printing and an image area A3 is an area in which dot image is to be printed.

The print is started from a left upper corner of the image area A2, and the characters are printed in a printing direction A10. When a NEW LINE code is input, the next print position is moved by a line width A12 set for a new line in a new line direction A11. Furthermore, when a RETURN code is input, the next print position is moved to a return position A13 which is at the rightmost position of the image area A3. It is to be noted here that the orientation of the paper sheet has nothing to do with the paper passing direction, and the scanning direction of the laser.

Furthermore, the imaging position is stored as a cursor position $P_1$ ($x_1$, $y_1$), and the address of the imaging position is calculated as a corresponding memory address of the cursor in the BM-RAM 32. The address $P_1$ is not outputted, however, an address $P_2$ which is positioned at a left upper corner of the current image is outputted because of the construction of the hard-ware. In order to calculate the address $P_2$, the position ($x_1$, $y_1$) of the address $P_1$, a memory size w in a width direction of the current image and a line number h of the written image in the vertical direction are required. The address $P_2$ is calculated according to the following equation:

Address $P_2 = (y_1 - h + 1) \times w \times 16 + x_1$ wherein one word is comprised of 16 bits data.

By performing the above processing, the format for the final print result is determined. Since the above processing is different from the actual editing and imaging processings into the BM-RAM 32, the above processing is considered to be an imaginary editing. Furthermore, when the top character of the page is written, the paper size of the current cassette is checked at step #42, and "1" is set to the LPWRITE flag representing the start of the temporary editing.

<IFC Command Processing>

Figure 12A:
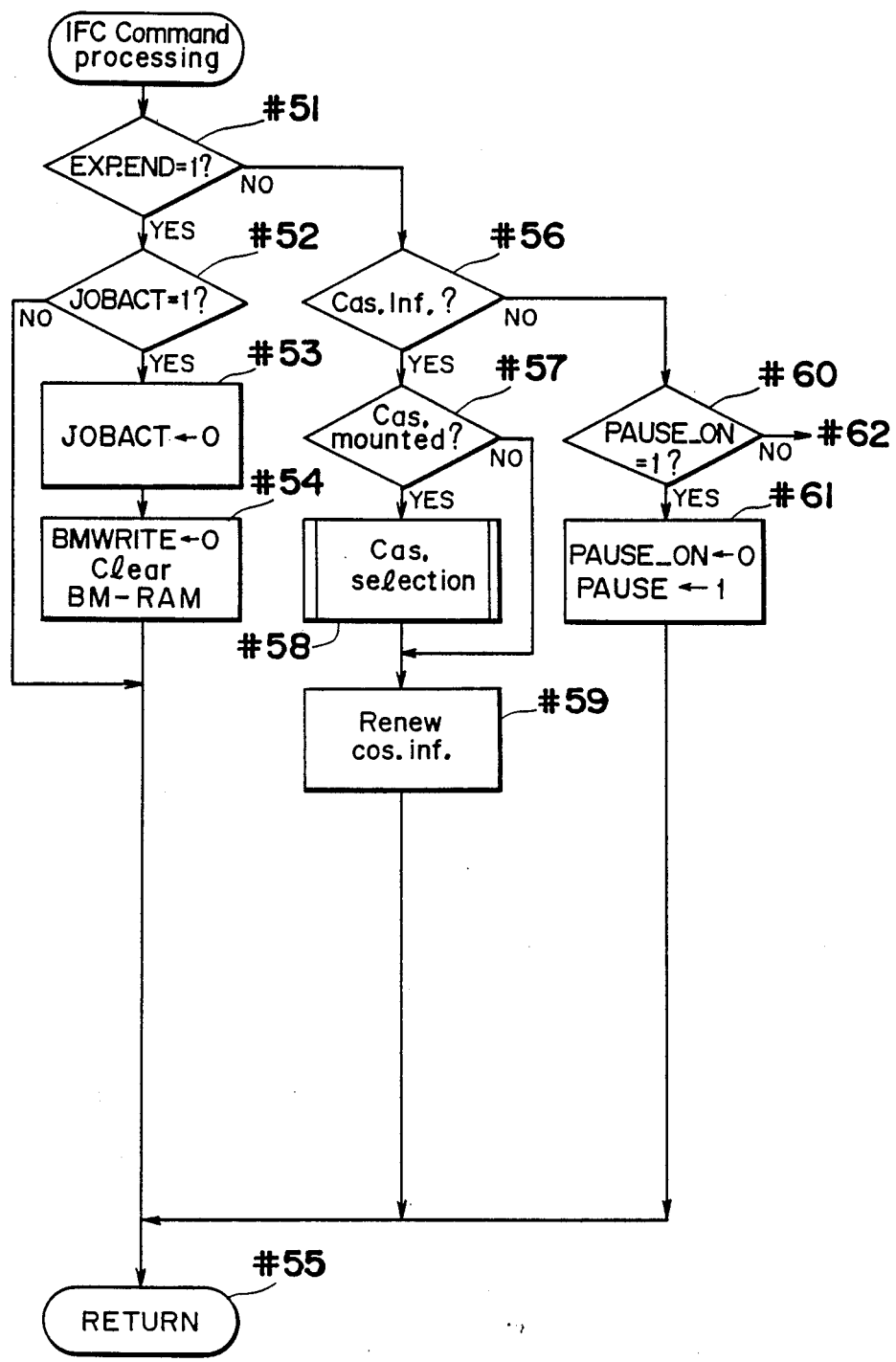
Figure 12B:
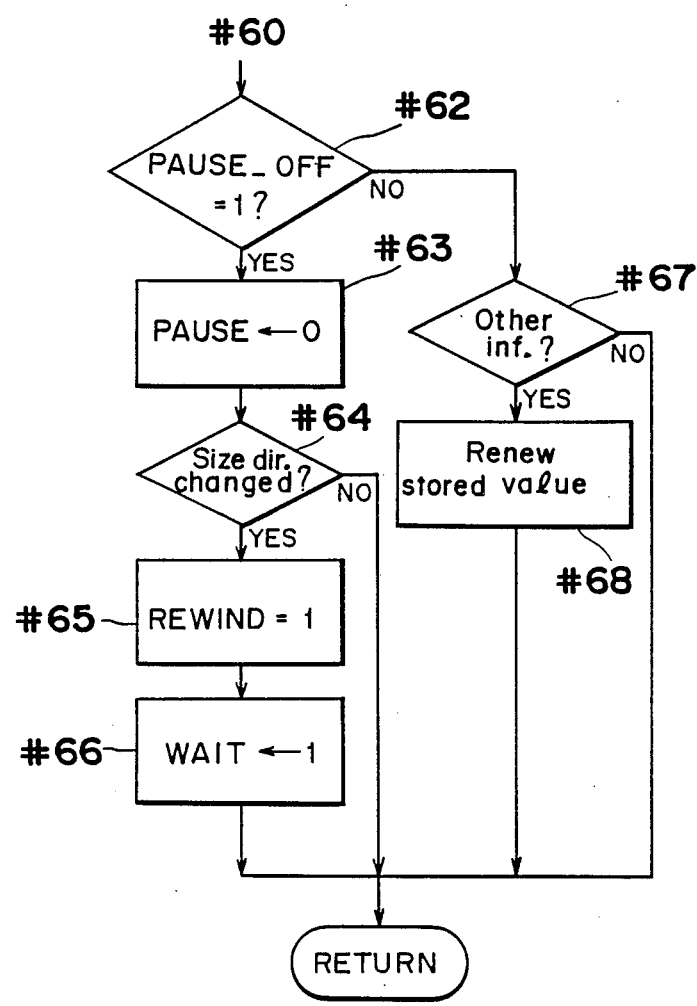

FIGS. 12a and 12b are flow charts showing the processing for the commands from the IFC 40 (step #12).

It is judged whether or not a EXP.END command is 1 at step #51. If the EXP.END command is 1, the the program flow goes to step #52. On the other hand, if the EXP.END command is not 1 at step #51, the program flow goes to step #56.

The EXP.END command is provided for establishing the synchronization of the print sequence between the bit map controller 30 and the IFC 40, and this command represents that a laser exposure for printing a piece of paper is completed in the print engine 4. This command is effective only during printing. Therefore, if the JOBACT flag is not 1 at step #52, the program flow returns. On the other hand, if the JOBACT flag is 1 at step #52, the program flow goes to step #53. Thereafter, the JOBACT flag representing the print state is reset at step #53, and the BMWRITE flag representing the imaging state into the BM-RAM 32 is reset at step #54, and then, the program flow returns for preparation for the next image.

At step #56, it is judged whether or not the paper feeding cassette information is received. If the paper feeding cassette information is received, the program flow goes to step #57. On the other hand, if the paper feeding cassette information is not received at step #56, the program flow goes to step #60.

At step #57, it is judged whether or not a cassette is mounted newly. If a cassette is mounted newly, the mounted cassette is considered to be the cassette which accommodates the paper sheets which the user would like to print, the cassette information which is initialized previously is renewed at step #59, and then, the program flow returns. On the other hand, if a cassette is not mounted newly, the program flow goes to step #59.

At step #60, it is judged whether or not the PAUSE ON command is received. If the PAUSE ON command is received, the PAUSE.ON command is reset and "1" is set to the PAUSE flag at step #61, and then, the program flow returns. On the other hand, if the PAUSE ON command is not received at step #60, the program flow goes to step #62.

At step #62, it is judged whether or not the PAUSE OFF command is received. If the PAUSE OFF command is received, the PAUSE flag is reset in order to cancel the PAUSE state at step #63, and then, it is judged whether or not alteration of the paper size or the printing direction has been performed at step #64. On the other hand, if the PAUSE OFF command is not received at step #62, the program flow goes to step #67.

If alteration of the paper size or the printing direction has been performed at step #64, "1" is set to the REWIND flag at step #65 in order to request the reanalysis in the received data processing as shown in FIG. 11a and "1" is set to the WAIT flag for stopping the packet analysis temporarily at step #66, and then, the program flow returns. The WAIT flag is reset in accordance with the CONTINUE packet outputted to the P-buffer 305 at the beginning of the reanalysis. On the other hand, if alteration of the paper size or the printing direction has not performed at step #64, the program flow returns.

At step #67, it is judged whether or not the other information is received. If the other information is received, the stored value is renewed for the other use, and then, the program flow returns. On the other hand, the other information is not received at step #67, the program flow returns.

<Packet Processing>

Figure 13A:
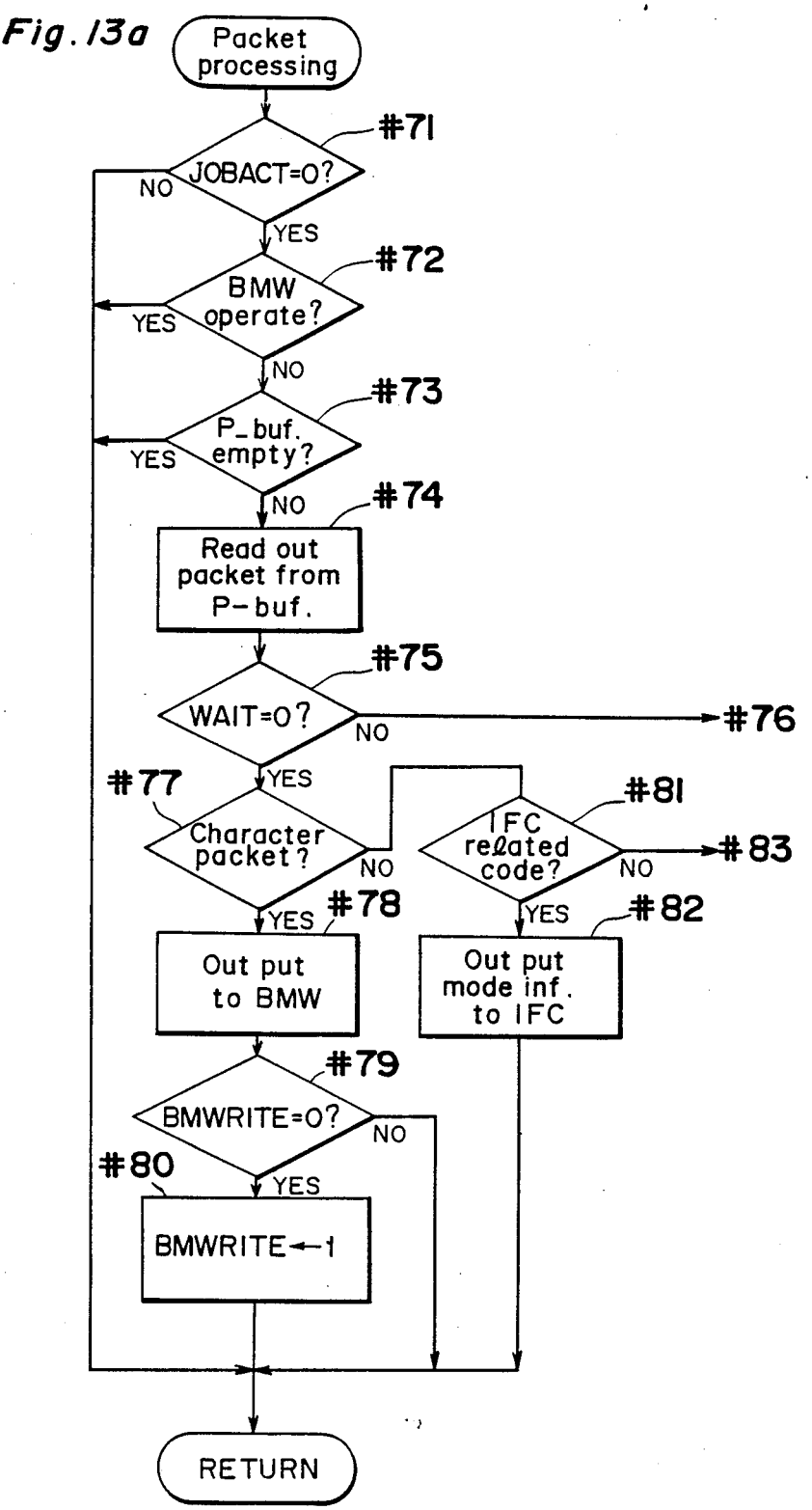
Figure 13B:
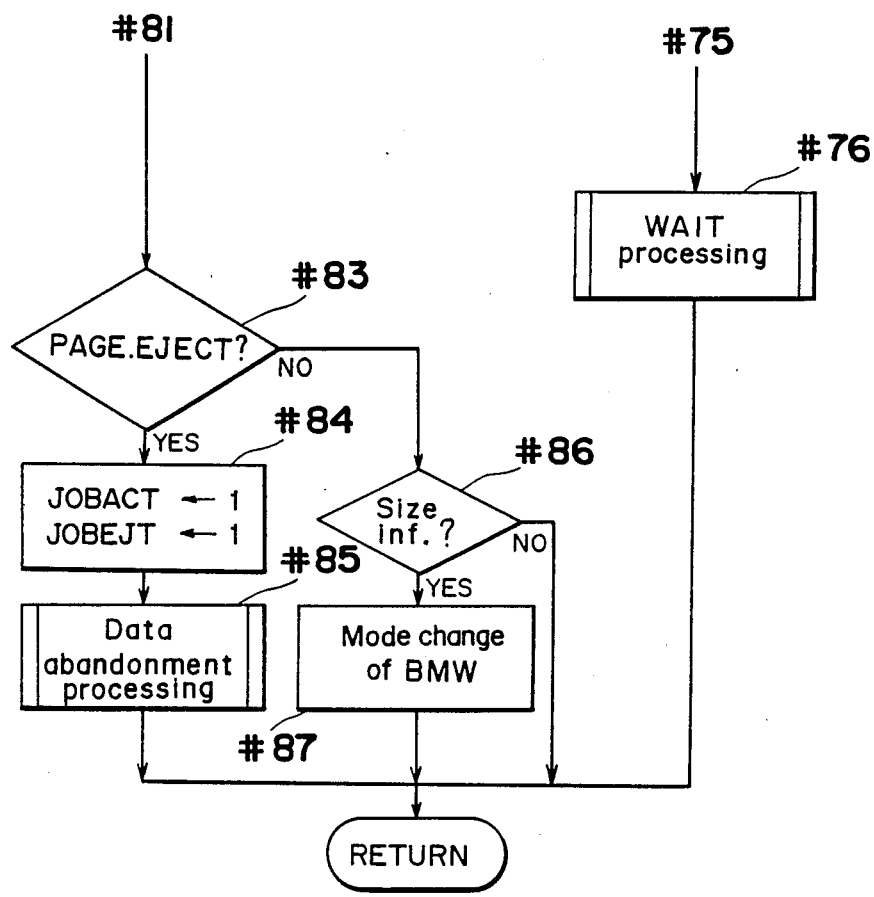

FIGS. 13a and 13b are flow charts showing the packet processing (step #13). In the packet processing, the packet stored in the P-buffer 305 is processed. As the packets, there are provided a packet for character to be printed and a packet for control.

The BM-RAM 32 can be altered only when the print out of the former image is completed. Therefore, if the print engine 4 is in the print state (JOBACT=1) at step #71, the packet processing is not performed, and then, the program flow returns. If no packet is stored in the P-buffer 305, or the P-buffer 305 is in the empty state at step #73, the packet processing is not performed, and then, the program flow returns. On the other hand, if a packet is stored in the P-buffer 305 at step #73, the packet is read out at step #74, and then, it is judged whether or not the WAIT flag is 0 at step #75.

Figure 19:
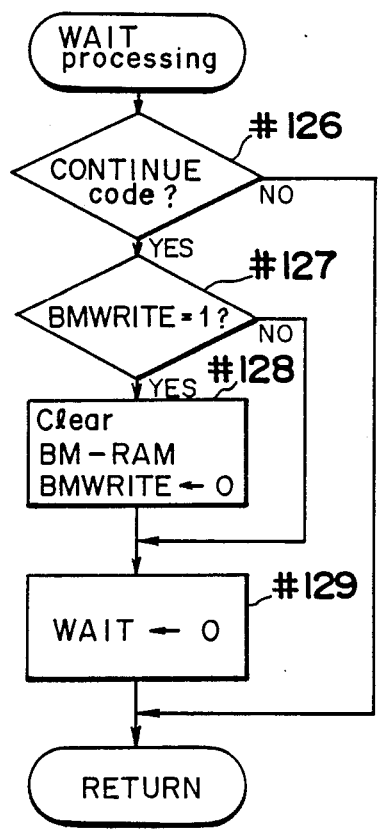

If the WAIT flag is not 0 at step #75, the wait processing is performed at step #76 as shown in FIG. 19, and then, the program flow returns. On the other hand, the WAIT flag is 0 at step #75, it is judged whether or not the packet for character is received at step #77.

If the packet for character is received at step #77, the received packet is outputted to the bit map writer 31 at step #78. The bit map writer 31 analyzes the input packet and outputs the image pattern corresponding to the font address designated by the input packet from the font memory 33 into the BM-RAM 32. If the bit map writer 31 processes one packet at step #72, the program flow returns since the bit map writer 31 can not process the next packet. On the other hand, if the packet character is not received at step #77, the program flow goes to step #81.

Thereafter, it is judged whether or not the received packet for character is the first packet for character (BMWRITE=0) at step #79. If the received packet for character is the first packet for character, "1" is set to the BMWRITE flag at step #80, and then, the program flow returns. On the other hand, if the received packet for character is not the first packet for character at step #79, the program flow returns.

If the received packet is not the packet for character at step #77, that is, the received packet is the packet for control, it is judged whether or not the received packet is the IFC related code at step #81. If the IFC related code is received, the IFC related code is outputted to the IFC 40 at step #82, and then, the program flow returns. The IFC related code includes information regarding the number of leaves for multi-print, the feeding paper cassette, and the operation mode of the accessory apparatus etc.. On the other hand, if the IFC related code is not received at step #81, it is judged whether or not a PAGE.EJECT code is received at step #83.

Figure 14:
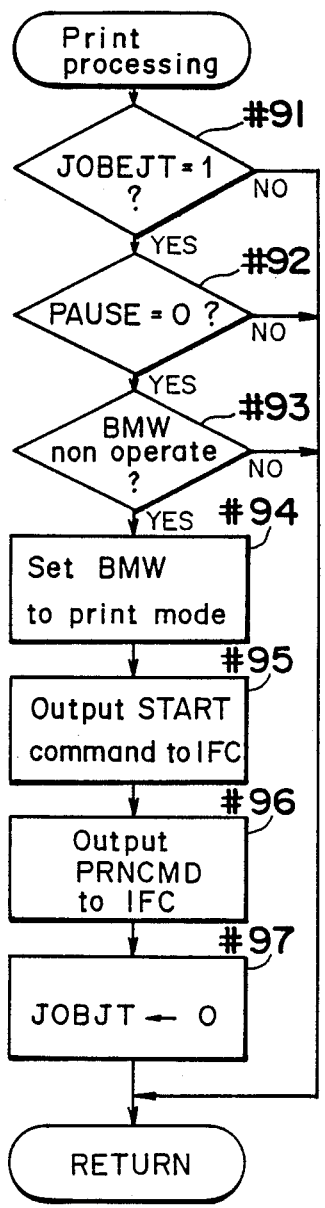
Figure 18:
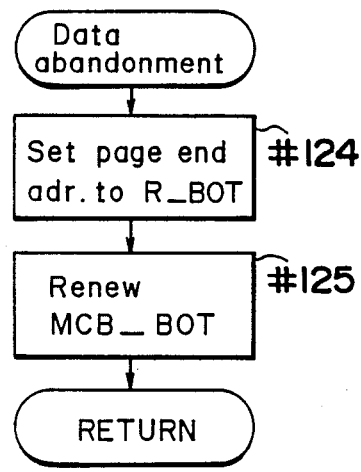

The PAGE.EJECT code represents the end of the page, and the image data stored in the BM-RAM 32 is outputted to the print engine 4 before the PAGE.EJECT code is outputted to the print engine 4. If the PAGE.EJECT code is received at step #83, "1" is set to the JOBACT flag so as to switch over the print engine 4 to be in the copy state and to inhibit the imaging operation into the BM-RAM 32, and "1" is set to the print start request flag JOBEJT at step #84. The JOBEJT flag is checked in the print control processing as shown in FIG. 14, and the print command PRNCMD is outputted actually to the IFC 40. Thereafter, the abandonment processing of data is performed at step #85 as shown in FIG. 18 since it is not necessary to reanalyze the received data, and then, the program flow returns.

On the other hand, if the PAGE.EJECT code is not received at step #83, it is judged whether or not the size information is received at step #86. If the size information is received, the size information is outputted to the bit map writer 31 so as to alter the write mode executed when the image data is written into the BM-RAM 32 by the bit map writer 31, and then, the program flow returns. The altered mode is mainly a memory capacity per one line of the image. On the other hand, if the size information is not received at step #86, the program flow returns.

<Print Control Processing>

FIG. 14 is a flow chart of the print control processing. In the print control processing, the print is started actually according to the JOBEJT flag for JOB control, the PAUSE flag and the state of the bit map writer 31.

The print is started when the print start is requested (JOBEJT =1, Yes at step #91), however, the print is not started when the print operation is stopped temporarily (PAUSE =1, No at step #92) or when the bit map writer 31 processes the final packet (No at step #93).

If JOBEJT =1, PAUSE =0, and the bit map writer 31 does not operate, the operation mode of the bit map writer 31 is switched over to the print mode at step #94, the START command for requesting start of feeding paper etc. 0 is outputted to the IFC 40 at step #95, and the print command PRNCMD for requesting start of the exposure operation is outputted to the IFC 40 at step #96. Thereafter, the JOBEJT flag is reset at step #97, and then, the program flow returns.

<Interruption Request Processing>

Figure 15:
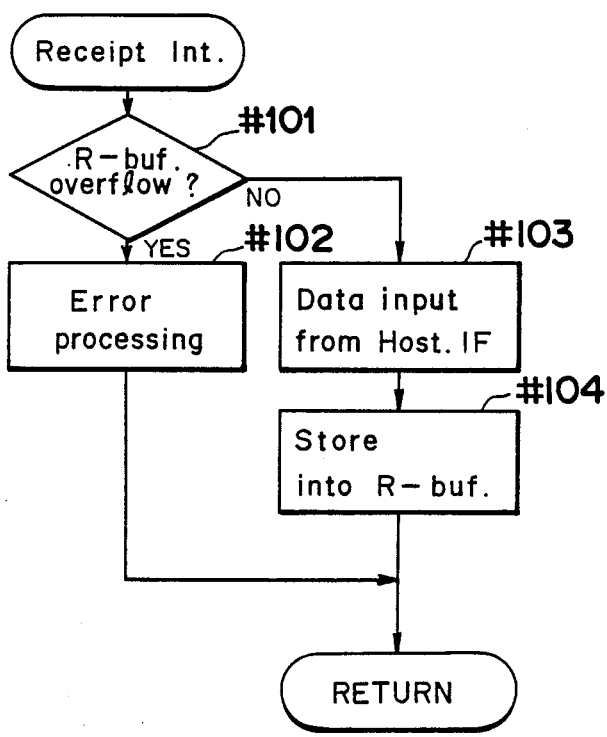

FIG. 15 is a flow chart showing the interruption request processing for the data transmission from the data processor interface 308.

It is judged whether or not the R-buffer 304 is in the overflow state at step #101, wherein the R-buffer 304 is judged to be in the overflow state when the write address R_TOP into the R-buffer 304 becomes the data storing address, or when the renewed address R TOP is equal to the address R_BOT.

If the R-buffer 304 is in the overflow state at step #101, an error processing is performed at step #102, and then, the program flow returns. On the other hand, if the R-buffer 304 is not in the overflow state at step #101, the data from the data processor 1 is input at step #103, the input data is stored in the address R_TOP of the R-buffer 304 at step #104, and then, the program flow returns.

<Data Reanalysis Processing>

Figure 16:
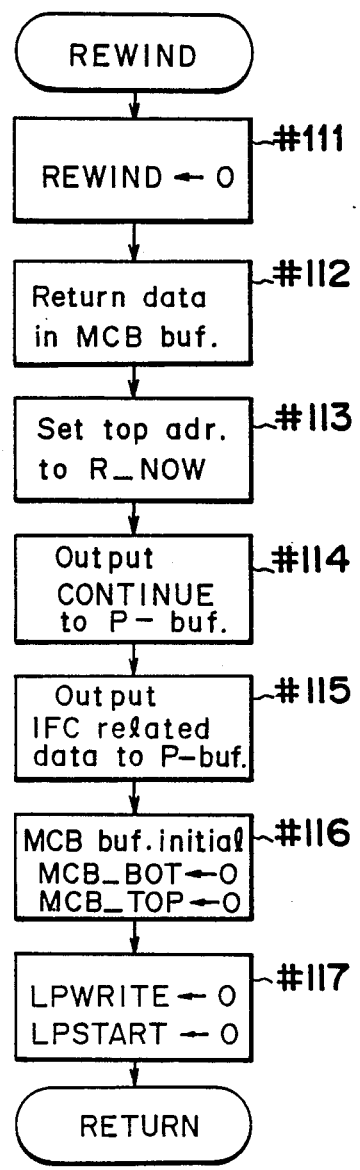

FIG. 16 is a flow chart showing the data reanalysis processing (REWIND).

In FIG. 16, the request flag REWIND is reset at step #111, and the information of the earliest page (not printed) stored in the address MCB_BOT is returned to the MCB so as to set the same condition for the analysis as the condition for the first analysis of the designated page at step #112. Thereafter, the top address of the page is set to the read pointer R_NOW for the analysis at step #113, the CONTINUE code is outputted to the P-buffer 305 so as to cancel the WAIT state in the packet processing at step #114, and the IFC related code stored in the MCB is outputted to the P-buffer 305 so as to renew the operation mode of the print engine 4 at step #115.

Thereafter, the MCB buffer is initialized at step #116, that is, "0" is set to the pointers MCB_BOT and MCBTOP, and the LPWRITE and LPSTART flags for the temporary editing are reset at step #117. As a result, when the top character data is analyzed (Yes at step #41 as shown in FIG. 11b), the image size is altered at step #42 as shown FIG. 11b.

<Storing MCB Temporarily>

FIG. 17 is a flow chart showing the processing for storing the MCB information temporarily to the MCB buffer.

In FIG. 17, the address R_NOW of the R-buffer 304 corresponding to the end position of the page (actually, the address of the top data of the next page) is stored to the MCB at step #121, wherein the address R_NOW is used for representing the processing range for the data abandonment processing shown in FIG. 18.

Thereafter, the data of the whole MCB is stored in the address MCB_TOP of the MCB buffer at step #122, the address MCB_TOP is renewed at step #123, the program flow then returns.

<Data Abandonment Processing>

FIG. 18 is a flow chart showing the data abandonment processing.

In FIG. 18, the page end address MCB_BOT of the MCB data regarding the earliest page is set to the address R_BOT of the R-buffer 304 representing the data storing area step #124, resulting in that the received data is abandoned. Thereafter, the address MCB_BOT is renewed so as to abandon the MCB data of the designated page at step #125, and then, the program flow returns.

<WAIT Processing>

FIG. 19 is a flow chart showing the WAIT processing. In the WAIT processing, when the paper size is altered during the PAUSE state and the temporary editing data stored in the P-buffer 305 is edited again in the form of the new paper size, the temporary editing data is edited without reading the old data.

In FIG. 19, it is judged whether or not the data read out from the P-buffer 305 (at step #74 shown in FIG. 13) is the CONTINUE code representing the top position of the new data at step #126. If the read data is not the CONTINUE code, the program flow returns so as to edit the data without reading the old data. On the other hand, if the CONTINUE code is detected at step #126, it is judged whether or not the former data is stored in the BM-RAM 32 (BMWRITE =1) at step #127.

If the BMWRITE flag is 1, the BM-RAM 32 is cleared for the preparation for imaging bit images into the BM-RAM 32 and the BMWRITE flag is reset at step #128, and then, the program flow goes to step #129. On the other hand, if the BMWRITE flag is not 1at step #127, the program flow goes to step #129 directly.

At step #129, the WAIT flag is reset, and then, the program flow returns so as to return to the normal packet processing.

<Image Size Check Processing>

FIG. 20 is a flow chart showing the image size check processing. The image size check processing is performed at the top position of each page, and the processing is performed, mainly, in order to alter the image size for the temporary editing when the size of the currently selected cassette (which is set initially at step #10 shown in FIG. 10, in reference to FIG. 22) has been altered.

In FIG. 20, it is judged whether or not the paper size corresponding to the using cassette code has been altered by checking the cassette information input from the interface processor 40 at step #47. If the paper size has been altered, the cassette selection processing is performed in the cassette position designation mode at step #48, and then, the program flow returns. On the other hand, the paper size has not been altered at step #47, the program flow returns.

<Cassette Selection Processing>

FIG. 21 is a flow chart showing the cassette selection processing. The cassette selection processing is performed only at the time before the print data is received (LPWRITE =0, i.e., Yes at step #131), in order to establish the layout of the image edited temporarily. In the cassette designation, there are a cassette designation mode designated by the paper size (referred to hereinafter as the size designation mode) and a cassette designation mode designated by the cassette mounting position (referred to hereinafter as the cassette position designation mode). If the same mode as the designated mode is set in both of the modes, the cassette selection processing is omitted (No at step #133 and No at step #141).

In the case of the size designation mode (Yes at step #132), the cassette of the designated size is searched at step #134 based on the stored cassette information (at step #59 shown in FIG. 12a), it is judged whether or not the cassette of the designated size is found out at step #135. If the cassette of the designated size is found out, the program flow goes to step #136. On the other hand, if the cassette of the designated size is not found out at step #135, the program flow returns.

On the other hand, in the case of the cassette position designation mode (No at step #132), it is checked whether or not the designated cassette is mounted at step #142, the program flow goes to step #136.

At step #136, it is judged whether or not blank paper is set in the designated cassette. If blank paper is set at step #136, the program flow goes to step #137. On the other hand, if no blank paper is set at step #136, the program flow returns.

At step #137, the using cassette code and the paper size are stored in the MCB at step #137, and an image size is calculated and the calculated data of the image size is stored in the MCB at step #138. The image size calculated at step #138 includes size data ($x_{max}$, $y_{max}$) in terms of dots, effective image size data ($x_{limit}$, $y_{limit}$), word number data in the horizontal direction etc. as shown in FIG. 8.

Thereafter, the paper feeding cassette designation code is outputted to the P-buffer 305 at step #139, and the size information is outputted to the P-buffer 305 at step #140, and then, the program flow returns.

<Paper Feeding Cassette Initial Setting Processing>

Figure 22:
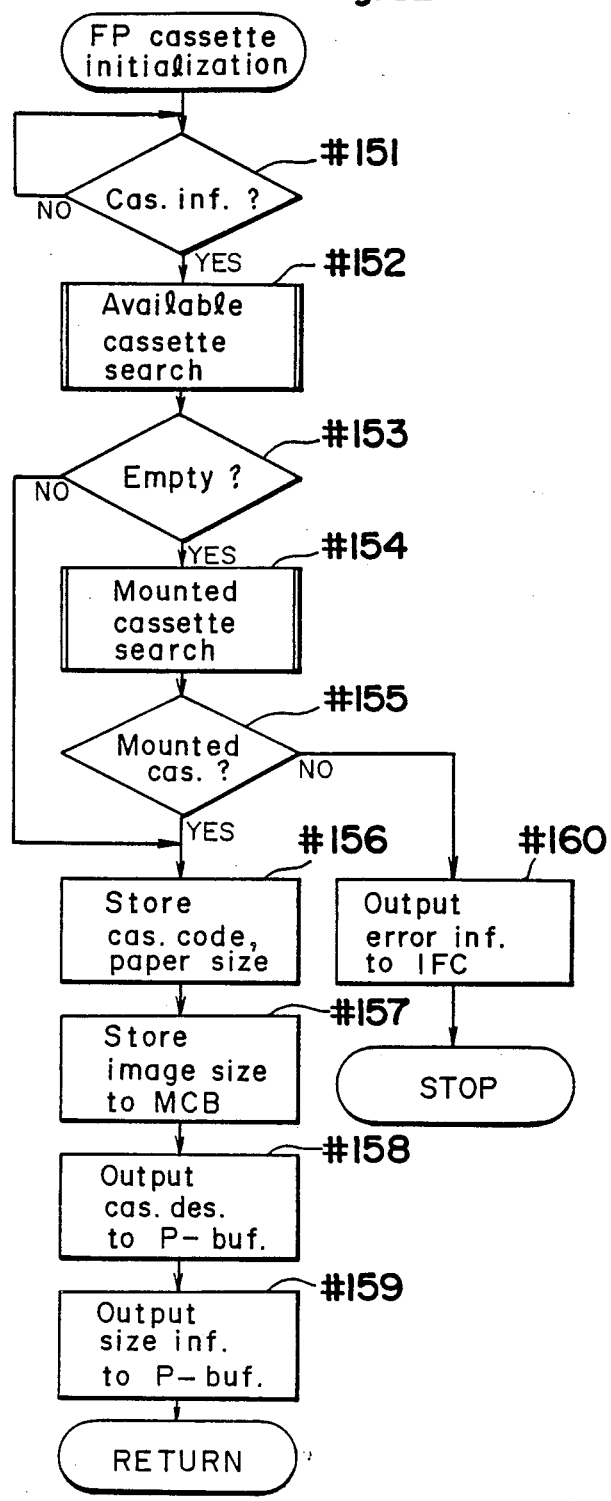

FIG. 22 is a flow chart showing the paper feeding cassette initial setting processing. The cassette information is used, mainly, when the write address into the BM-RAM 32 for the image edited temporarily is calculated at step #42 as shown in FIG. 11b, or when the bit map writer 31 is controlled at step #87 as shown in FIG. 13b.

In FIG. 22, first of all, the bit map controller 30 becomes in the cassette information waiting state from the IFC 40 at step #151. When the power is supplied, the IFC 40 transmits the initial information of each cassette (referred to hereinafter as the cassette information) to the bit map controller 30, thereafter, the IFC 40 transmits the cassette information when the cassette information is altered. The cassette information includes the paper sizes of respective cassettes 51, 52 and 53 shown in FIG. 4, the presence or absence of the blank papers, and the presence or absence of the mounted cassettes. The above paper sizes are not in the form of the dot size, and are in the form of paper size codes predetermined for every size of the blank papers.

Figure 23:
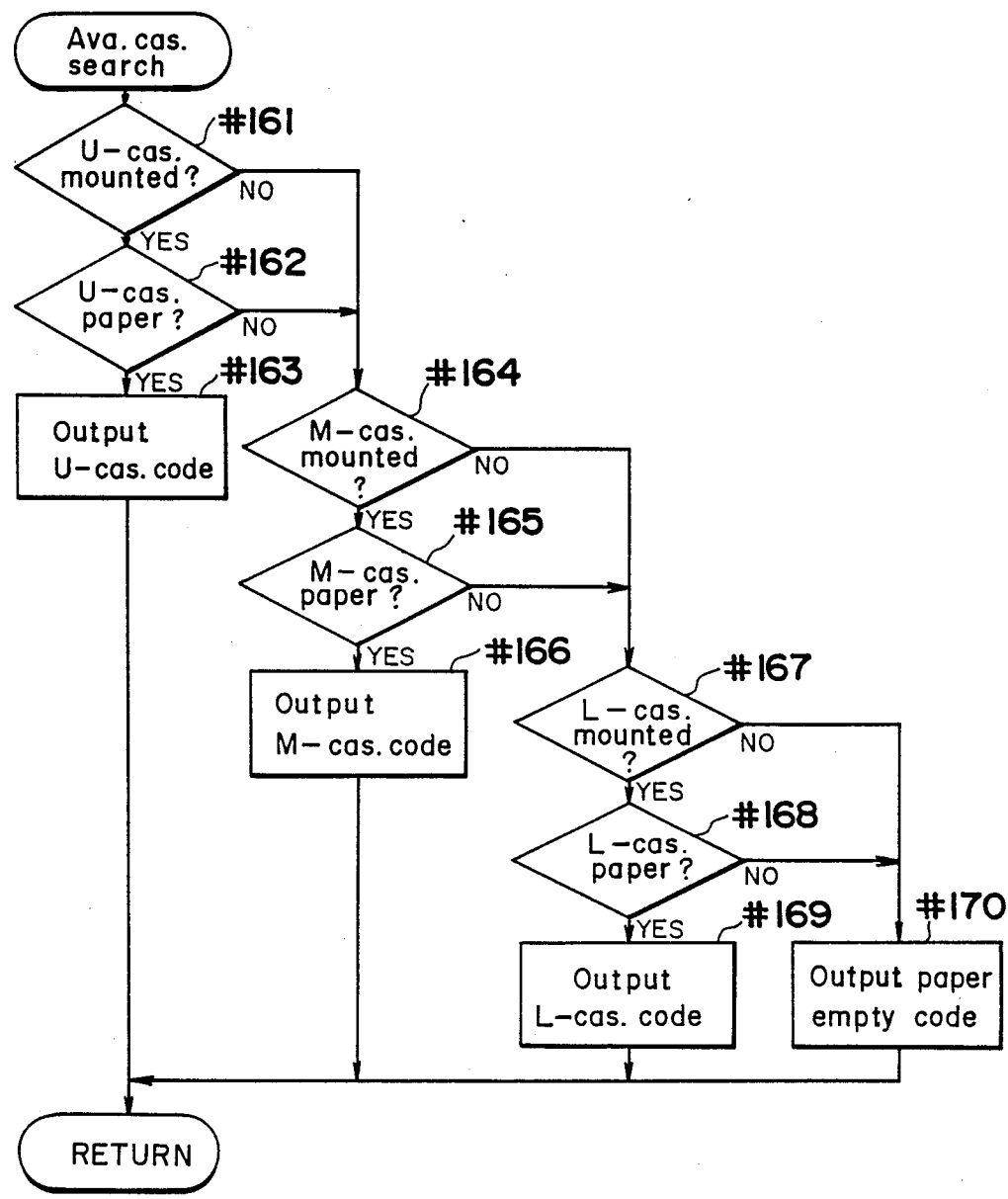

When the cassette information is received at step #151, the initial cassette selection processing is performed. In the processing, a priority order is predetermined for the respective cassettes 51, 52 and 53 (in the preferred embodiment, the cassette 51 has the highest priority and the cassette 53 has the lowest priority). When at least one cassette is mounted and blank paper is set in the mounted cassette, the available cassette is searched according to the above priority order at step #152 as shown in FIG. 23.

Thereafter, it is judged whether or not blank paper is set in at least one cassette at step #153. If blank paper is set in at least one cassette, the program flow goes to step #156. On the other hand, if no blank paper is set in all of the cassettes at step #153, the available cassette is searched in the mounted cassettes according to the above priority order at step #154. The processing of step #154 is performed in order to take the cases into consideration when blank paper is run out of in a cassette having high frequency of use and when a cassette is not mounted in order to inhibit use of the cassette having the high priority order, but being in a trouble state. If an available cassette is mounted at step #155, the program flow goes to step #156. On the other hand, if an available cassette is not mounted at step #155, the program flow goes to step #160.

The using cassette code corresponding to the cassette determined in the above processing and the paper size code thereof are stored in the MCB at step #156, and the image size of the paper set in the determined cassette, such as a word number w in the width direction of the paper etc., is calculated based on a paper size attribute table stored previously, and then, the calculated image size is stored in the MCB at step #157 in order to make preparations for the calculation of the write address into the BM-RAM 32. Thereafter, the packet for designating the paper feeding cassette in the form of the IFC related code is outputted to the P-buffer 305 at step #158, and the size information is outputted to the P-buffer 305 in order to the operation mode of the bit map writer 31 at step #159, and then, the program flow returns.

At step #160, it is considered that all of the cassettes are in an abnormal state, an error code is outputted to the IFC 40 at step #160, and then, the processing is stopped. In order to return to a normal state of the printer system, after a cassette is mounted, the printer system is initialized by turning the power supply off and then on.

<Available Cassette Search Processing>

FIG. 23 is a flow chart showing the available cassette search processing.

It is judged whether or not the upper cassette 51 is mounted at step #161, and it is judged whether or not blank paper is set in the upper cassette 51 at step #162. If the upper cassette 51 is mounted (Yes at step #161) and blank paper is set in the upper cassette 51 (Yes at step #162), the upper cassette code is returned at step #163, and then, the program flow returns. On the other hand, if the upper cassette 51 is not mounted (No at step #161), or blank paper is not set in the upper cassette 51 (No at step #162), the program flow goes to step #164.

Thereafter, it is judged whether or not the middle cassette 52 is mounted at step #164, and it is judged whether or not blank paper is set in the middle cassette 52 at step #165. If the middle cassette 52 is mounted (Yes at step #164) and blank paper is set in the middle cassette 52 (Yes at step #165), the middle cassette code is returns at step #166, and then, the program flow returned. On the other hand, if the middle cassette 52 is not mounted (No at step #164), or blank paper is not set in the middle cassette 52 (No at step #165), the program flow goes to step #167.

Thereafter, it is judged whether or not the lower cassette 53 is mounted at step #167, and it is judged whether or not blank paper is set in the lower cassette 53 at step #168. If the lower cassette 53 is mounted (Yes at step #167) and blank paper is set in the lower cassette 53 (Yes at step #168), the lower cassette code is returned at step #169, and then, the program flow returns. On the other hand, if the lower cassette 53 is not mounted (No at step #167), or blank paper is not set in the lower cassette 53 (No at step #168), the program flow goes to step #170.

At step #170, a paper empty code is returned, and then, the program flow returns.

<Mounted Cassette Search Processing>

Figure 24:
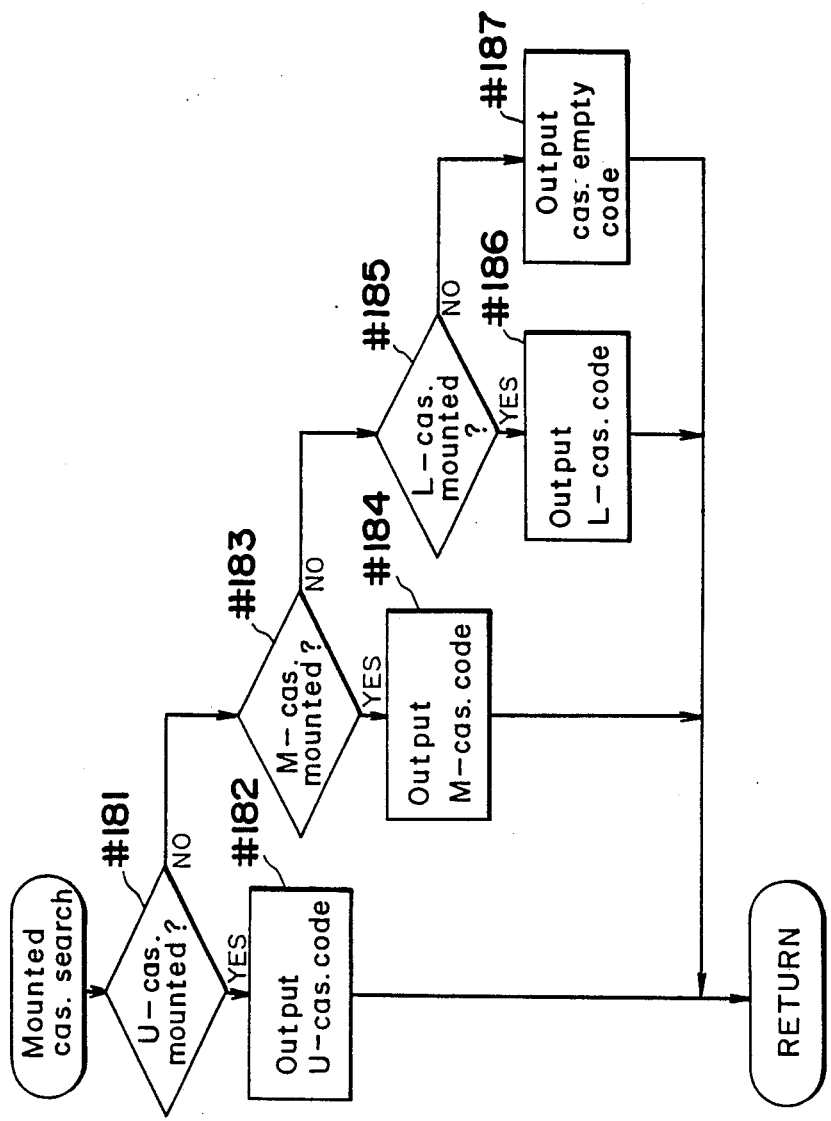

FIG. 24 is a flow chart showing the mounted cassette search processing.

In FIG. 24, it is judged whether or not the upper cassette 51 is mounted at step #181. If the upper cassette 51 is mounted (Yes at step #181), the upper cassette code is returned at step #182, and then, the program flow returns. On the other hand, if the upper cassette 51 is not mounted (No at step #181), the program flow goes to step #183.

Thereafter, it is judged whether or not the middle cassette 52 is mounted at step #183. If the middle cassette 52 is mounted (Yes at step #183), the middle cassette code is returned at step #184, and then, the program flow returns. On the other hand, if the middle cassette 52 is not mounted (No at step #183), the program flow goes to step #185.

Thereafter, it is judged whether or not the lower cassette 53 is mounted at step #185. If the lower cassette 53 is mounted (Yes at step #185), the lower cassette code is returned at step #186, and then, the program flow returns. On the other hand, if the lower cassette 53 is not mounted (No at step #185), the program flow goes to step #187.

At step #187, a cassette empty code is returned, and then, the program flow returns.

(d) Processing for Interface Controller (IFC)

Figure 25:
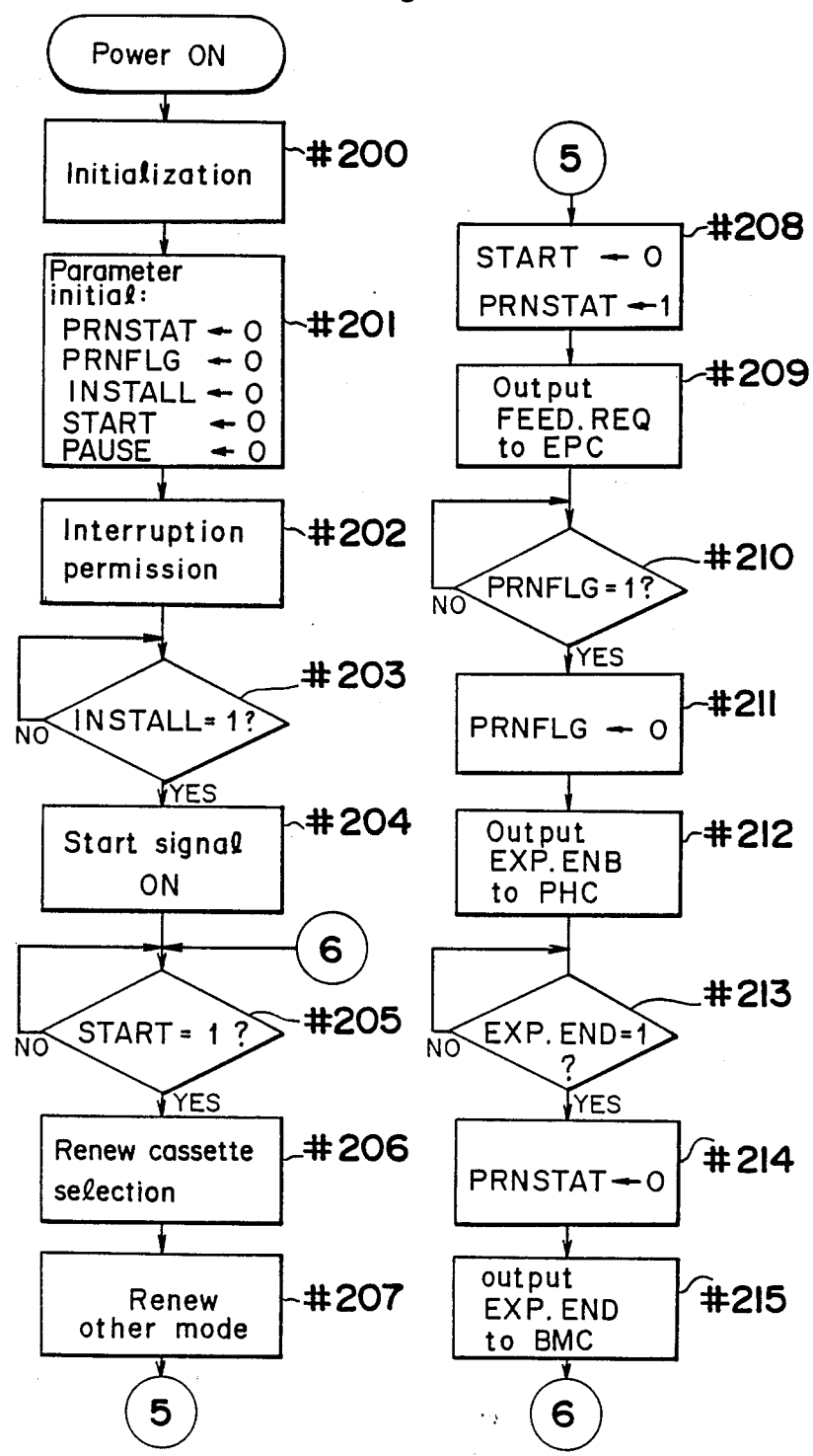
FIG. 25 is a flow chart showing a processing of an interface controller shown in FIG. 5.

FIG. 25 is a flow chart showing the processing for the IFC 40.

The IFC 40 is initialized internally at step #200, and respective flags are initialized at step #201. Functions of the respective flags are as follows:

PRNSTAT : representing that the print engine 4 is printing.
PRNFLG : representing detection of the print command from the bit map controller 30
INSTALL : representing completion of the check of the initial state of the print engine 4.
START : representing detection of the START command from the bit map controller 30.
PAUSE : representing the state of the PAUSE key.

Figure 26A:
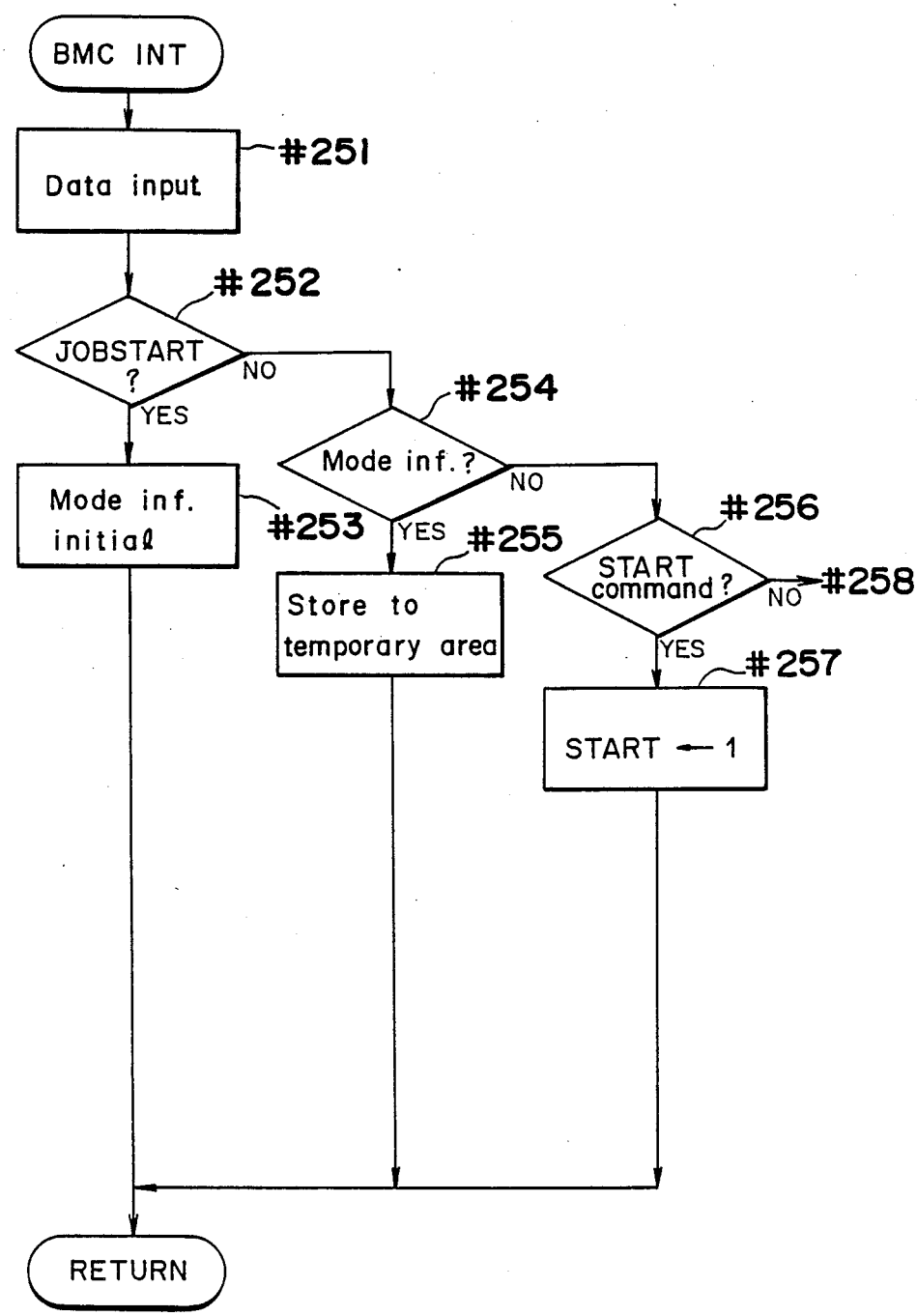
FIGS. 26a and 26b are flow charts showing a processing of a bit map controller interruption.
Figure 26B:
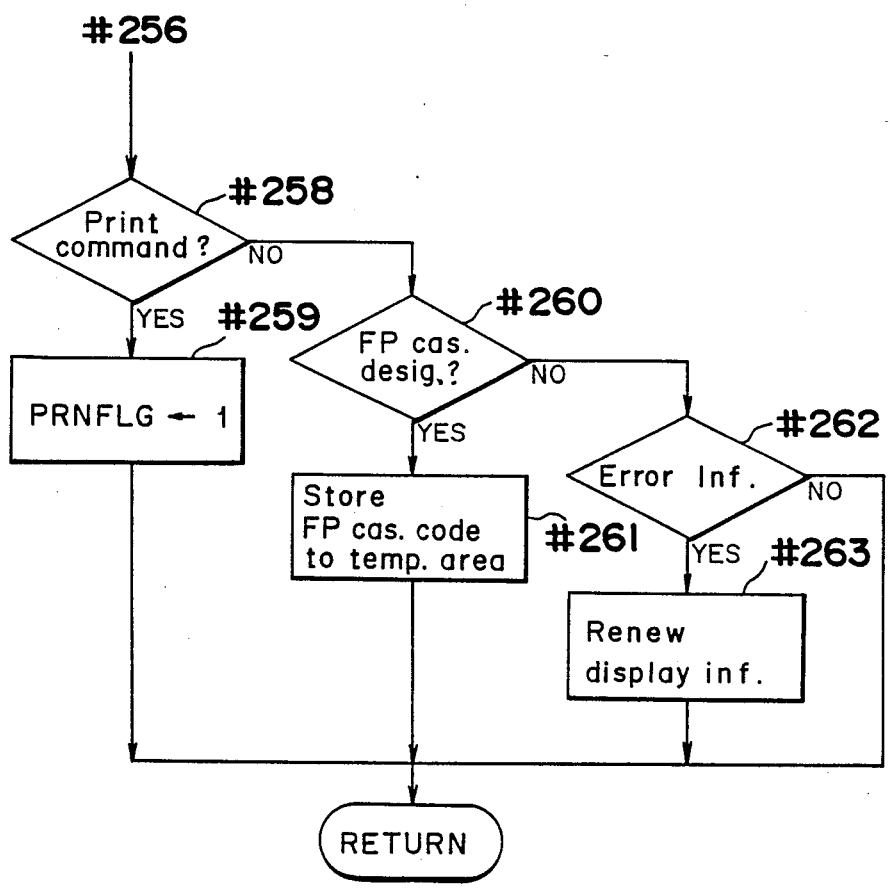
Figure 27A:
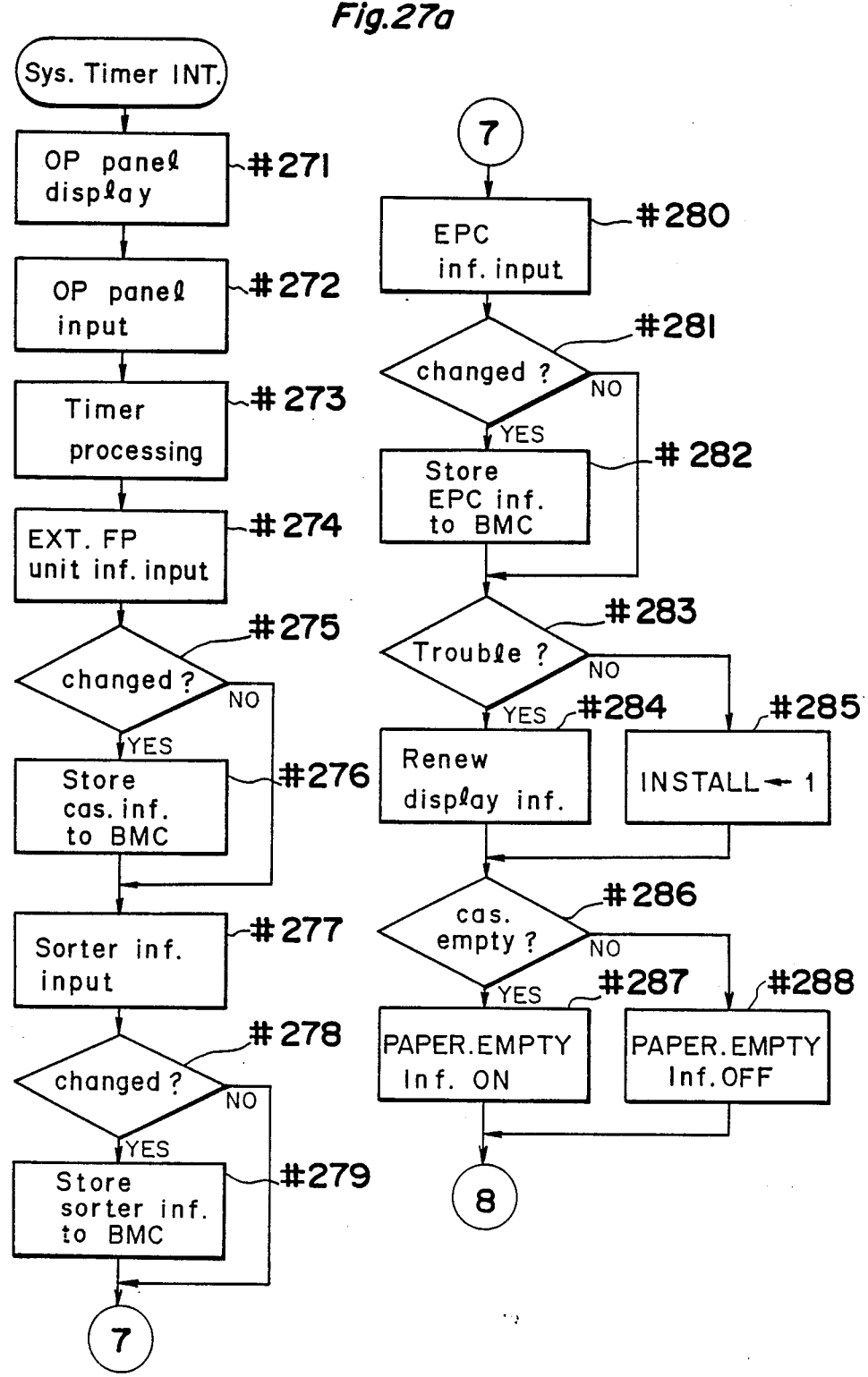
FIGS. 27a and 27b are flow charts showing a processing of a system timer interruption.
Figure 27B:
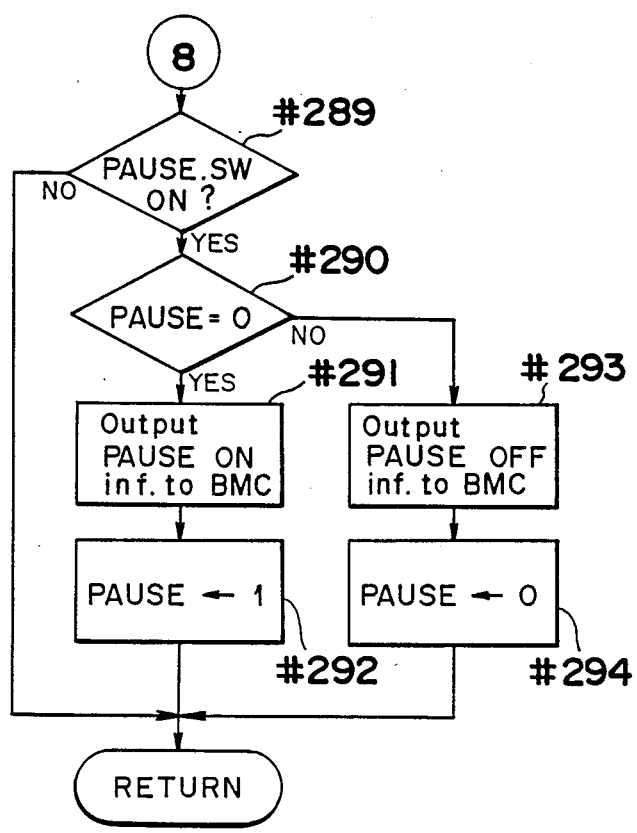

After the initialization of the above flags, two interruption processings are allowed at step #202, and if the print engine 4 is in the normal condition (INSTALL = 1) at step #203, a starting signal is applied to the sorter 6, the external paper supply unit 5, the electrophotographic controller 41 and the print head controller 42 through the bus B5 at step #204 for transfer into the processing loop. It is to be noted here that the interruption includes a bit map controller interruption for receiving the commands etc. from the bit map controller 30 (as shown in FIGS. 26a and 26b), and a system timer interruption for effecting control for the operation panel 44 and a timer processing (as shown in FIGS. 27a and 27b).

The presence or absence of any trouble at the print engine 4 is checked in the system timer interruption processing, and in the main routine, it can be ensured by the INSTALL flag.

Before the description of the processing loop, the two interruption processings will be described.

First of all, the bit map controller interruption processing (shown in FIGS. 26a and 26b) will be described.

In the bit map controller interruption processing, the reception processing of the command transferred from the bit map controller 30 is performed. Specifically, in the bit map controller interruption processing, the received command is not directly executed, but the flag in the IFC 40 is only set, and the actual processing is performed when this flag is detected in the processing loop. This arrangement is intended to simplify the construction of the processing loop by making the communication between the processing loop and the bit map controller 30 asynchronous. Meanwhile, in the case of the mode information of the print or the accessories (Yes at step #254), such information is stored in the temporary area at step #255 so as to be formally taken in within the processing loop.

Subsequently, the system timer interruption processing will be described, referring to to FIGS. 27a and 27b.

In the system timer interruption processing, the input and output processings of the operation panel 44 (at steps #271 and #272), a count processing of the timer set in the processing loop (at step #273), and checking of the state at each part of the print engine 4 (at steps #275, #278 and #281) are performed. If there is any change to be notified to the bit map controller 30, it is outputted to the bit map controller 30 (at steps #276, #279 and #282). Furthermore, the size of the paper feeding cassette and the presence or absence of the blank paper are checked in the processing, the cassette information is stored in the BMC (at steps #274 to #276). Moreover, checking is performed for the presence or absence of any trouble (at step #283), and if any trouble is present, it is displayed on the operation panel 44, while if not, the INSTALL flag is set for notifying to the processing loop that the print engine 4 was checked to be normal (at step #285). Every time the PAUSE key 901 for requesting the temporary stop of the print is pushed down, the PAUSE ON or the PAUSE OFF are effected alternately (at steps #289 to #294). The PAUSE flag is used for judging the state of the PAUSE key. The state of the PAUSE flag is displayed at a PAUSE LED 918 shown in FIG. 3 (at step #271). Every time the state of the PAUSE flag is altered, the state information thereof is transferred to the BMC (at step #291 and #293).

Referring back to FIG. 25, the description of the processing loop will be continued hereinafter.

At the first stage of the processing loop, the IFC 40 becomes in the print start request waiting state (at step #205), and upon the reception of the print start request, the mode information for the accessories is renewed (at steps #206 and #207), and then, the detected START flag is reset, thereby establishing the print state (PRNSTAT = 1) (at step #208). Thereafter, in order to effect the first printing, the paper feeding request signal FEED.REQ is applied to the electro-photographic controller 41 through the bus B5 (at step #209), whereby the electro-photographic controller 41 causes the electro-photographic processor 45 for the paper feeding and the printing to start. However, the paper takes a stand-by state at a predetermined position. In the case where the external paper supply unit 5 is designated, the electro-photographic controller 41 starts only the electro-photographic processor 45, and the paper feeding is effected by the external paper supply unit 5. It is to be noted here that the stand-by position of the paper is the same in this case.

Thereafter, the interface controller 40 becomes in the print command waiting state (at step #210).

When the IFC 40 detects that PRNFLG = 1 representing the reception of the print command, the request flag PRNFLG is reset (at step #211), an EXP.ENB signal for allowing the exposure is outputted to the print head controller 42 (at step #212), whereby the actual exposure is effected at the print head controller 42.

After the completion of the exposure, the print head controller 42 outputs the EXP.END signal to the IFC 40. When the IFC 40 receives the EXP.END signal (at step #213), the print state is canceled, i.e., the PRNSTAT flag is reset (at step #214), and then, the IFC 40 outputs the EXP.END signal for allowing the print of the next page to the BMC (at step #215), and the next print command (START = 1) waiting state is established (at step #205).

It should be noted here that the IFC 40 controls not only the aforementioned processings but also a communication within the print engine 4, the IFC 40 exchanges data with the respective controllers 41 and 42 through the bus B5, and also has a relaying function for the communication between the respective controllers 41 and 42. The detailed description of these functions of the IFC 40 is omitted, since these functions are not related to the present invention directly.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. A controller for a printer for printing data received from an external data processor, comprising:
    a communication means for receiving the data from said external data processor;
    a first memory means for storing the data received by said communication means;
    a conversion means for converting the data stored in said first memory means into formulated data based on predetermined format data;
    a second memory means for storing the formulated data converted by said conversion means;
    an output means for outputting the formulated data stored in said second memory means to said printer;
    an input means for inputting a command to alter the format data; and
    a control means for making said conversion means convert again the data stored in said first memory means, corresponding to the formulated data stored in said second memory means, in accordance with the command of said input means.

2. The controller for the printer as claimed in claim 1, wherein said control means inhibits an output of the converted data obtained during the second conversion to said external data processor.

3. A controller for a printer for printing data received from an external data processor, comprising:
    a communication means for receiving the data from said external data processor;
    a first memory means for storing the data received by said communication means;
    a first converting means for converting the data stored in said first memory means to intermediate codes;
    a second memory means for storing the intermediate codes converted by said first converting means;
    a second converting means for converting the intermediate codes stored in said second memory means to bit images;
    a third memory means for storing the bit images converted by said second converting means;
    an output means for outputting the bit images; stored in said third memory means, to said printer;
    an input means for inputting a command to alter the format data; and
    a control means for invalidating the intermediate codes stored in said second memory means and making said first converting means convert again the data stored in said first memory means t the intermediate codes based on the altered format data, so as to perform reprocessing of bit images in accordance with the alteration of the format data, input by said input means.

4. The controller for the printer as claimed in claim 3, wherein said control means inhibits the output of a response data obtained during the reprocessing to said external data, processor.

5. The controller for the printer as claimed in claim 3, wherein said input means comprises an input key for instructing interruption of the printing, and outputs the format data obtained from a paper feeding part of said printer regarding paper to be used after the input operation of said input key.

6. The controller for the printer as claimed in claim 3, wherein said converting first means and said second converting means operate separately.

7. A controller for a printer for printing data received from an external data processor, comprising:
    a communication means for receiving the data from said external data processor;
    a first memory means for storing the data received by said communication means;
    a conversion means for converting the data stored in said first memory means into formulated data based on predetermined format data;
    a second memory means for storing the formulated data converted by said conversion means;
    an output means for outputting the formulated data stored in said second memory means to said printer; and
    a control means for making said conversion means convert again the data stored in said first memory means, corresponding to the formulated data which is first converted by said conversion means and inhibiting the output of a response data obtained during the second conversion of the data to said external data processor.

8. The controller for the printer as claimed in claim 7, wherein said control means is started in accordance with a command from an input means arranged in said printer.

9. A controller for a printer for printing data received from an external data processor, comprising:
    a communication means adapted to receive the data from said external data processor;
    a memory means for storing the data received by said communication means, said data being stored in a first portion thereof;
    a conversion means for converting the data stored in the first portion of said memory means into formulated data based on predetermined format data, said conversion means storing the formulated data in a second portion of said memory means;
    an output means for outputting the formulated data stored in the second portion of said memory means to said printer;
    an input means for inputting a command to alter the format data, and
    a control means for making said conversion means convert again the data stored in the first portion of said memory means in accordance with said command of said input means to a reformulated data corresponding to the altered format data, said control means temporarily inhibiting the output of data obtained during the second conversion to said external data processor.

* * * * *